US011730317B2

(12) United States Patent
Mao

(10) Patent No.: US 11,730,317 B2
(45) Date of Patent: *Aug. 22, 2023

(54) EGG BREAKER AND SEPARATOR DEVICE

(71) Applicant: Richard Mao, Lutherville, MD (US)

(72) Inventor: Richard Mao, Lutherville, MD (US)

( * ) Notice: Subject to any disclaimer, the term of this patent is extended or adjusted under 35 U.S.C. 154(b) by 374 days.

This patent is subject to a terminal disclaimer.

(21) Appl. No.: 16/901,689

(22) Filed: Jun. 15, 2020

(65) Prior Publication Data

US 2020/0345182 A1    Nov. 5, 2020

Related U.S. Application Data

(63) Continuation of application No. 16/524,504, filed on Jul. 29, 2019, now Pat. No. 10,722,076, which is a continuation-in-part of application No. 16/436,405, filed on Jun. 10, 2019, now abandoned, which is a continuation of application No. 16/416,950, filed on May 20, 2019, now abandoned.

(60) Provisional application No. 62/674,798, filed on May 22, 2018.

(51) Int. Cl.
    *A47J 43/14*    (2006.01)

(52) U.S. Cl.
    CPC ............. *A47J 43/14* (2013.01); *A47J 43/145* (2013.01)

(58) Field of Classification Search
    CPC ................................ A47J 43/14; A47J 43/145
    USPC ................................... 99/497, 498, 499, 500
    See application file for complete search history.

(56) References Cited

U.S. PATENT DOCUMENTS

| 940,119 | A | * | 11/1909 | Bayless et al. | 99/497 |
|---|---|---|---|---|---|
| 1,622,181 | A | * | 3/1927 | William | A47J 43/14 99/497 |
| 2,488,473 | A | * | 11/1949 | Lane | A47J 43/14 210/348 |
| 2,505,717 | A | * | 4/1950 | Nels | A47J 43/14 99/578 |
| 2,789,602 | A | * | 4/1957 | Gregorio | A47J 43/14 30/123 |

* cited by examiner

*Primary Examiner* — Reginald Alexander
(74) *Attorney, Agent, or Firm* — Offit Kurman, P.A.; Gregory A. Grissett

(57) ABSTRACT

A device is described for breaking an egg and separating an egg white from the yolk of the egg. The device includes a support base and a chute coupled to the support base. The chute has front end, a rear end, an enclosed section at the front end, and an open section at the rear end. The device includes a breaker that spans across the chute. The breaker is configured to crack a shell of the egg to release the yolk and the egg white onto the chute.

16 Claims, 19 Drawing Sheets

EGG BREAKER AND SEPARATOR DEVICE

CROSS-REFERENCE TO RELATED APPLICATIONS

The present application is a continuation of and claims the benefit of priority to U.S. application Ser. No. 16/524,504, filed Jul. 29, 2019, which is a continuation-in-part of and claims the benefit of priority to U.S. application Ser. No. 16/436,405, filed Jun. 10, 2019, which is a continuation of and claims the benefit of priority to U.S. application Ser. No. 16/416,950, filed May 20, 2019, which claims priority to and the benefit of U.S. Provisional Application No. 62/674,798, filed on May 22, 2018, the entire contents of each application listed in this paragraph are herein incorporated by reference.

TECHNICAL FIELD

The present disclosure relates to a device for breaking an egg, and in particular, to a device for breaking and opening an egg, separating the yolk from the albumen, and directing the egg white into a fry pan or other surface, e.g. such as a dish.

BACKGROUND

The concept of an egg breaker and egg white separator is well known. Indeed, this is a well-developed field and many prior art patent references are quite old. Many are designed for a commercial high-production setting. For example, U.S. Pat. No. 966,933 to George Lewis issued 9 Aug. 1910 shows an egg breaker and separator using a flat inclined chute 12 over which the broken egg must pass. U.S. Pat. No. 2,789,602 to Zagala issued 23 Apr. 1957 shows an eggshell breaker and separator in which a plurality of eggs may be positioned within a tubular container, the eggs successively broken and the yolk and white of the egg separated. Still others are designed for consumer use. For example, U.S. Pat. No. 2,589,408 to Le Boeuf issued 18 Mar. 1952 shows an egg breaker and separator in which a trigger constricts a collar about the egg and breaks it with teeth. U.S. Pat. No. 1,409,649 to Becker issued 14 Mar. 1922 shows an egg breaker and optional separator with a squeeze handle breaker attached to an egg receiver cup. U.S. Pat. No. 1,611,541 to McCrocklin issued Dec. 21, 1926 and U.S. Pat. No. 2,505,717 to Nastrom issued 10 Mar. 1947 both shows tools for breaking and separating eggs comprising a hand-operated scissor device in which squeezing the handles brings opposing halves of an egg cage together to constrain the egg, and continued squeezing urges a breaker blade into the shell. The yolk remains in the cage while the white drains through. U.S. Pat. No. 7,836,823 to Vassallo issued 23 Nov. 2010 shows a trap-like device with egg-piercing teeth. To break and open an egg, the egg is placed in a cavity, and the tool and egg are rapped sharply against a hard surface, such that the shell of the egg is pierced.

Although the above-described egg breaking and/or separating devices are well-intentioned, none are capable of breaking and opening, separating the yolk from the albumen, and directing the egg white into a fry pan or pot, all with a single hand in mere seconds with minimal effort and maximum reliability. Indeed, the prior art designs make no attempt to extricate the yolk from the egg white, the result usually being a broken yolk and/or poor separation. This is largely because the foregoing designs fail to take a systematic approach toward disassembling the complex structure of an egg. FIG. 1 is a diagrammatic view of the structure of a common egg. The yolk is supported within the albumin egg white and is suspended on opposing chalazae a pair of spring-like structures that project from the equatorial region of the vitelline membrane into the albumen. The chalazae act as balancers, maintaining the yolk in a steady position in the laid egg. The albumen is not of the same consistency throughout. This can be seen when emptying a fresh egg into a dish, the thinner, more watery, albumen spreads further than the thicker albumen which remains around the yolk. Within the unbroken egg, the same relationship occurs, the thicker albumen adhering to the vitelline membrane. To separate the yolk from the albumen, the yolk must be gently extricated from the albumen and isolated therefrom while the latter is drained, and then the yolk can be removed without breakage.

SUMMARY

An embodiment of the disclosure is a device configured to break and open an egg. The device includes a support base having a handle and a support member. The device includes a chute coupled to the support member. The chute has a front end, a rear end opposite the front end along a central axis. The device includes a nozzle coupled to the front end of the chute. The nozzle has an aperture that is sized to permit an egg white, an egg yolk, or both, to pass therethrough. The device includes a breaker positioned on the support member to span across the central axis of the chute.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings, illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Figure 1:
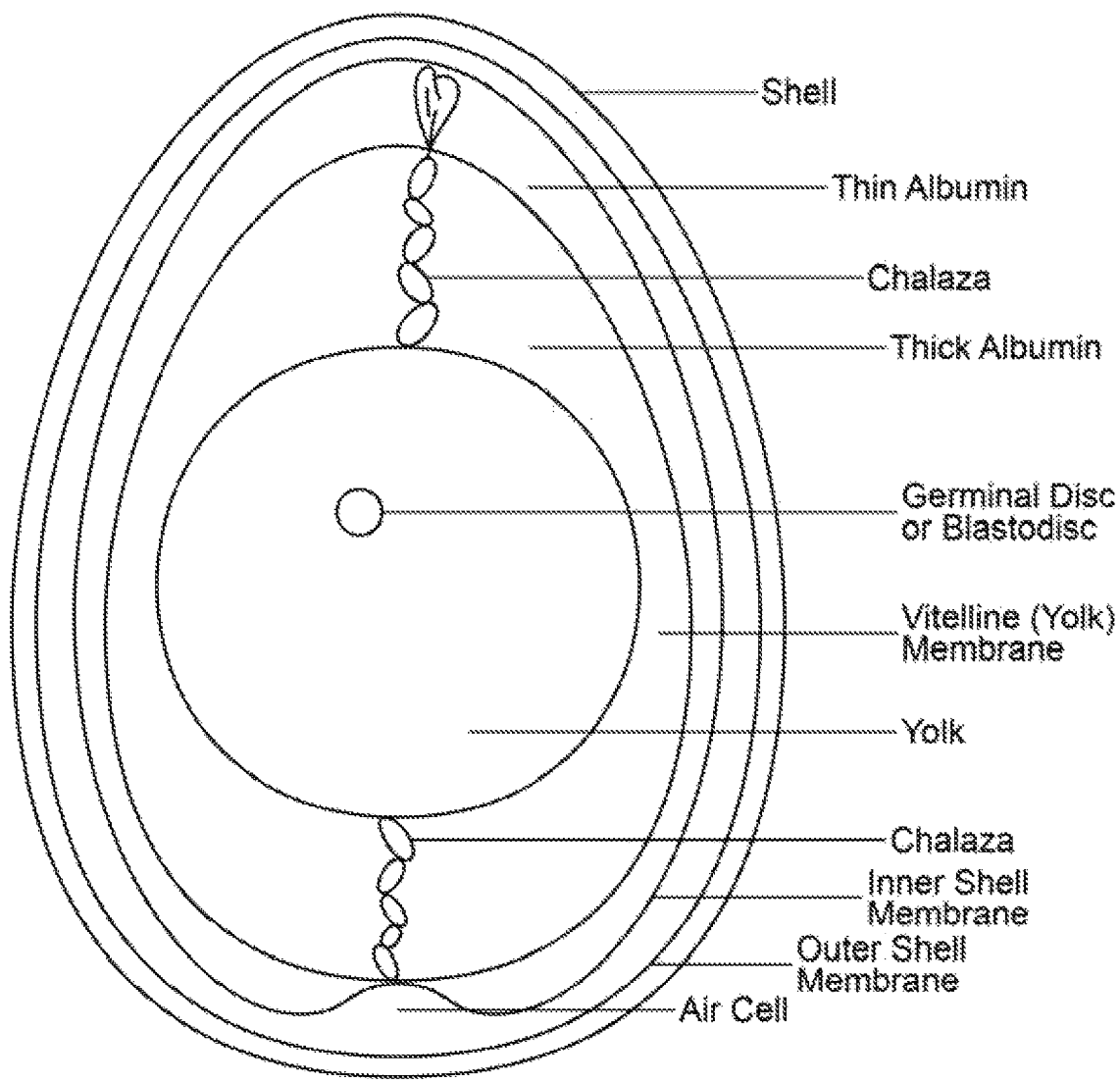
FIG. 1 is a sectional diagrammatic view of the composition of an egg.
Figure 2:
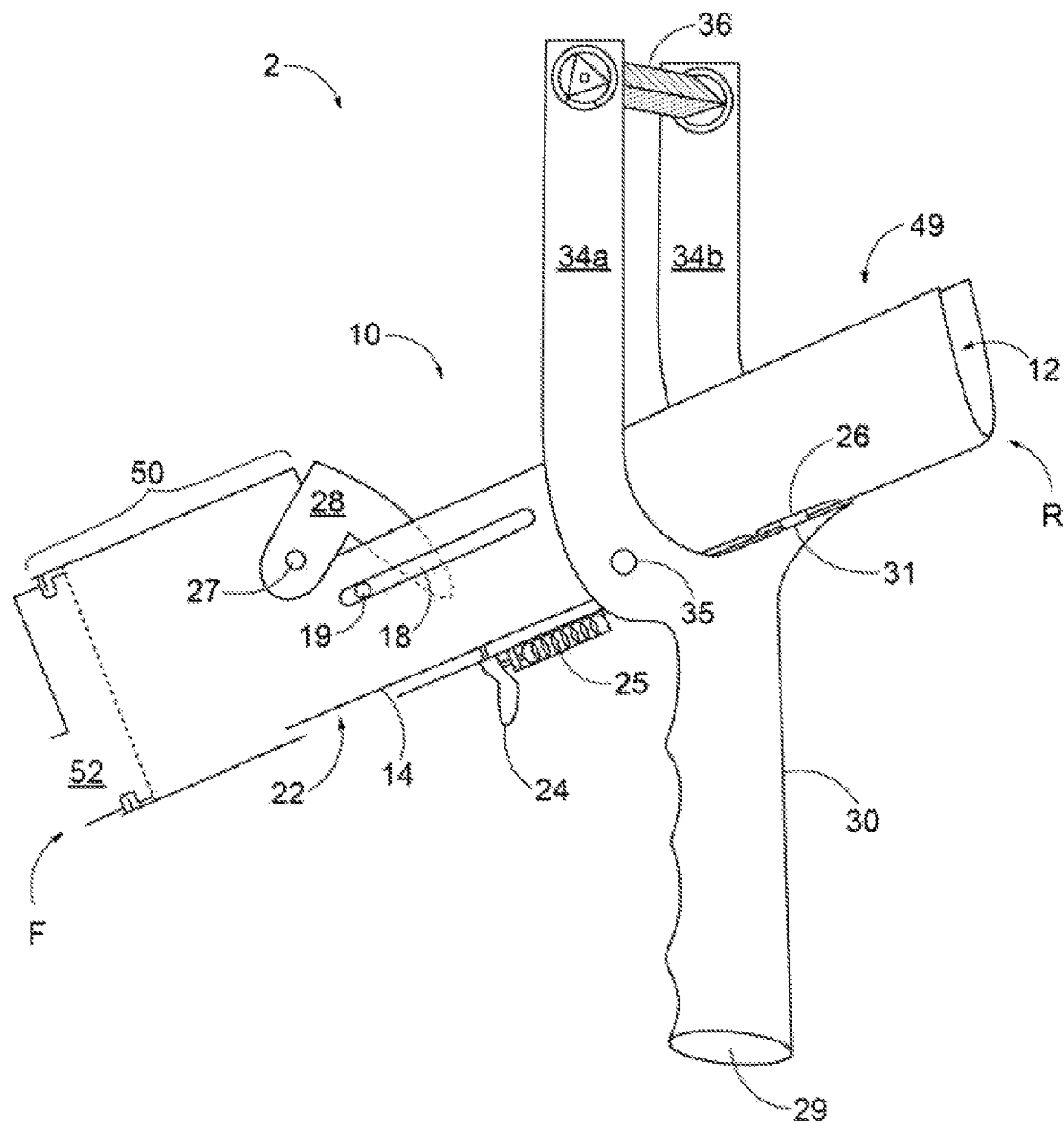
FIG. 2 is a side view of the device for breaking and opening an egg according to an embodiment of the invention.
Figure 3:
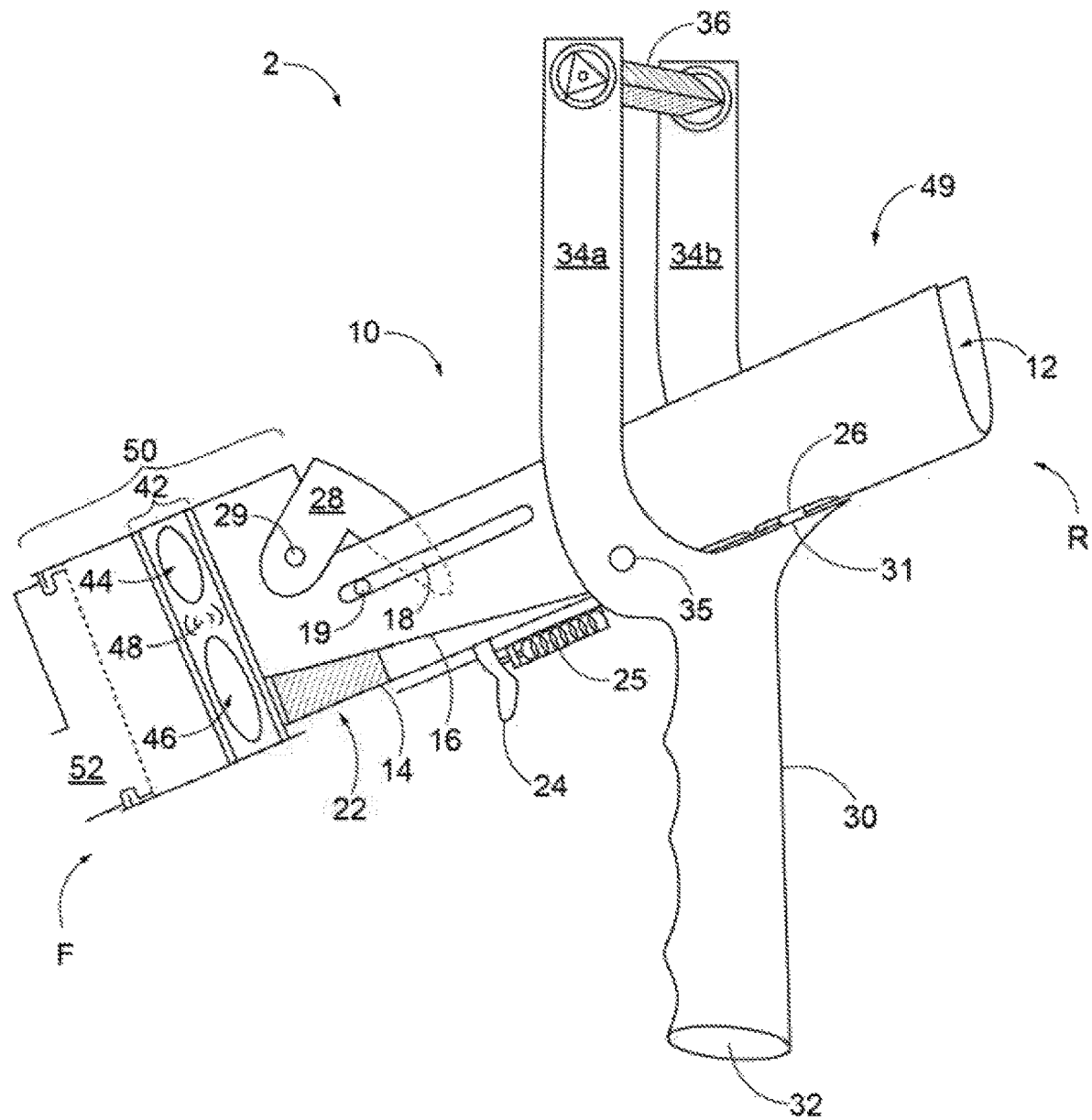
FIG. 3 is a side view of the device illustrated in FIG. 2, but showing an egg separation assembly, which is used to separate the egg yolk from the egg white and a ramp according to another embodiment of the present disclosure.

Embodiments of the present disclosure include a device for breaking an egg and optionally separating the egg white from the yolk. As shown in FIGS. 2 and 3, the device 2 includes a support base 30, a chute assembly 10 attached to the support base 30, a breaker bar 36, an egg separation assembly 42, and an optional nozzle 52. Optionally, the device 2 may also include a separate egg landing dish that is configured to receive the content of the egg exiting the device.

The chute assembly 10 may be removably attached to the support base 30 such that chute assembly 10 may be removed and separated from the support base 30 as needed. The chute assembly 10 has an elongated chute 12 along which the egg may travel by gravity. The chute 12, which may be inclined relative to horizontal, includes an open section 49 at a rear end R of the device 2 and an enclosed section 50 at the front F of the chute 12. As will be further discussed below, the cracked egg can travel along the chute 12 through the enclosed section 50 before exiting through the optional nozzle 52 to a receptacle (not number or shown). The receptacle can be a frying pan, pot, or dish, or anything else that receives the cracked egg. The open section 49 may be open approximately a distance of 5.0 inches measured from a rearward most point of the chute 12. In this regard, the measured distance is parallel to the direction of the egg travels along the chute. The enclosed section 50 may extend about 2.5 inches from the terminal end of the open section 49 to the a rearward most end of the nozzle. Again, this measured distance is parallel to the direction of the egg travels along the chute. The distances the open section 49 and the enclosed section 50 of the chute 12 may vary from the specific values discussed above. For instance, the distance of the open section may be less than 5.0 inches or greater than 5.0 inches as needed. Five inches is only exemplary. Likewise, the distance of the enclosed section 50 may be greater than 2.5 inches or less than 2.5 inches as needed. As illustrated in FIG. 2, the chute assembly 10 is attached to the support base 30 with an axle 35. However, the chute assembly 10 may be attached to support base 30 with other means, as described further below.

The support base 30 includes two opposing arms 34a and 34b that support the breaker bar 36. The breaker bar 36 is configured to facilitate breaking the shell of the egg. In the illustrated embodiment, the breaker bar 36 is positioned above the chute 12 so that the breaker bar spans across the chute 12. In the example shown, the breaker bar is positioned a distance between about 2 inches and 3 inches above the chute 12. In one example, the distance is about 2.5 inches. This particular distance is measured along a line that intersects the chute about two inches from a rearward end of a slide (discussed below). When the device 2 is resting on surface, this line is perpendicular to the surface upon which the device 2 rests. In some cases, the chute is inclined so that the line is angularly offset with respect to the surface of the chute. However, the breaker bar 36 may be positioned a distance that is less than three inches or is greater than three inches as needed. The breaker bar 36 may be rotatably mounted to arms 34a and 34b and straddles the arms 34a and 34b of the support base 30. In other examples, the breaker bar 36 may be removably mounted the arms 34a and 34b. In such an example, the breaker bar 36 does not specifically rotate. As illustrated, the arms 34a and 34b may be offset from the support base 30 a sufficient distance to allow the egg contents drop from the breaker bar 36 onto the chute. In one example, the offset distance is about one 1.5 inches.

Figure 5A:
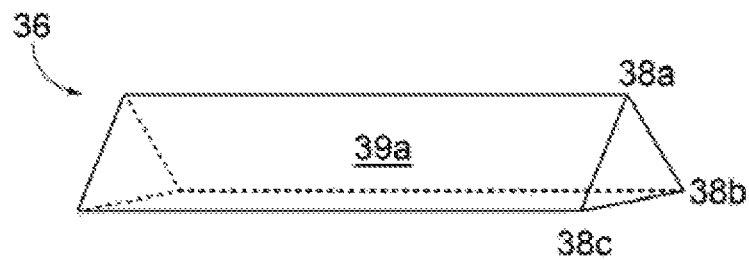
FIG. 5A is a top perspective view of a breaker bar used in the device illustrated in FIGS. 2-4.
Figure 5B:
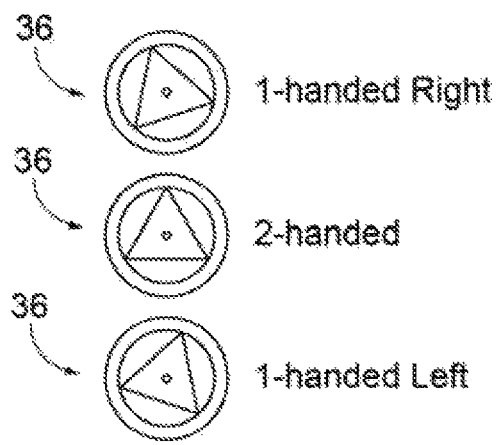
FIG. 5B illustrates side views of a breaker bar shown in FIG. 5A, with the break bar oriented in different positions.
Figure 5C:
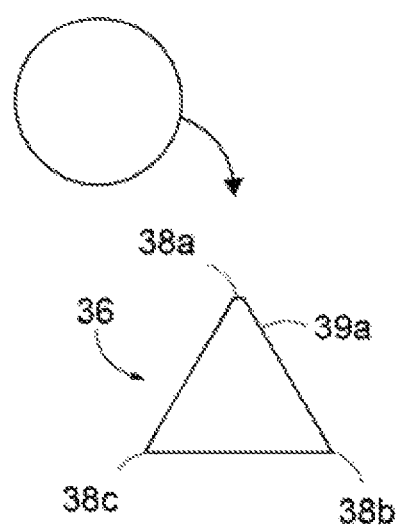
FIG. 5C is a side perspective view of an egg approaching a breaker bar used in the device illustrated in FIGS. 2-4.
Figure 6:
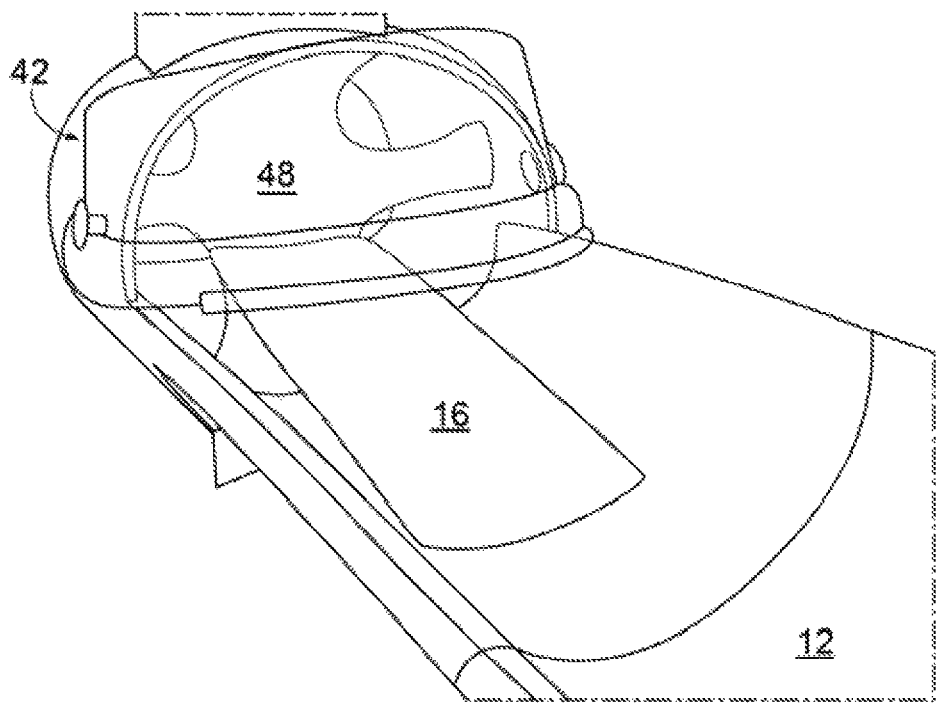
FIG. 6 is a rear perspective view of a portion of the device shown in FIGS. 2-4, illustrating a portion of the chute assembly.
Figure 7:
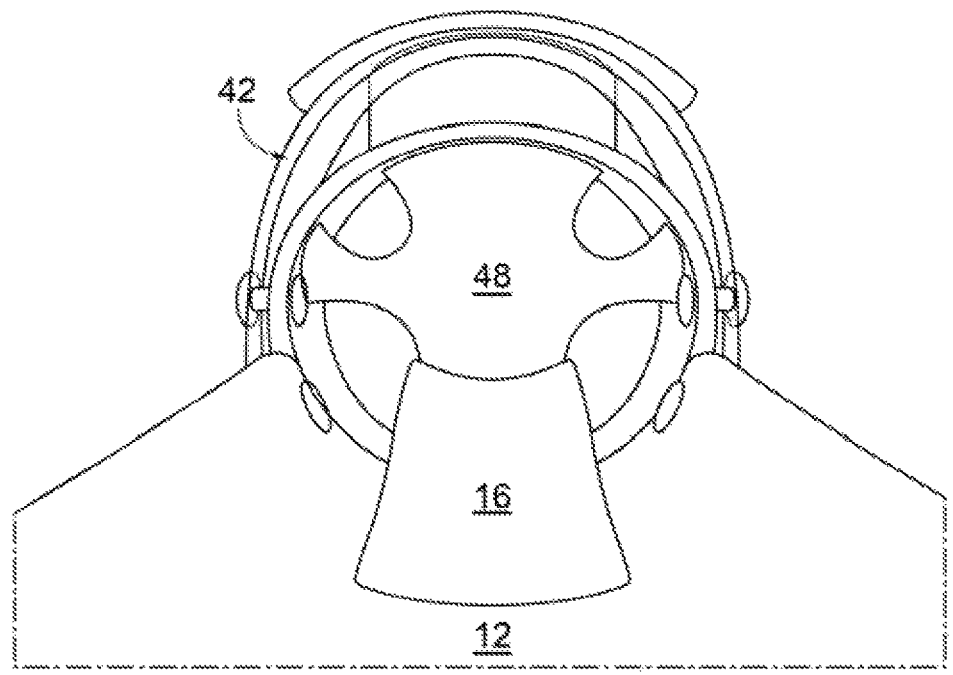
FIG. 7 is a top rear perspective view of a portion of the device shown in FIGS. 2-4, illustrating a portion of the chute assembly.
Figure 8:
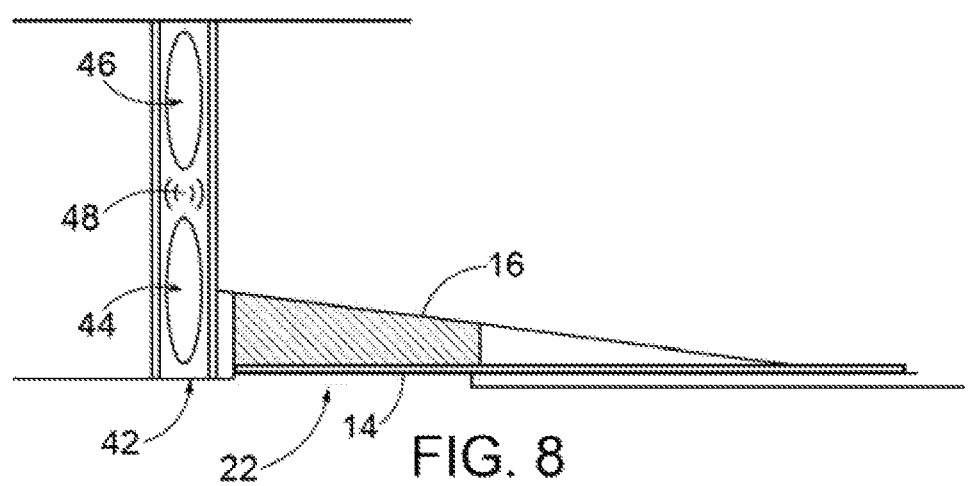
FIG. 8 is a side view of a portion of the device shown in FIGS. 2-4, illustrating an egg separation assembly.
Figure 9:
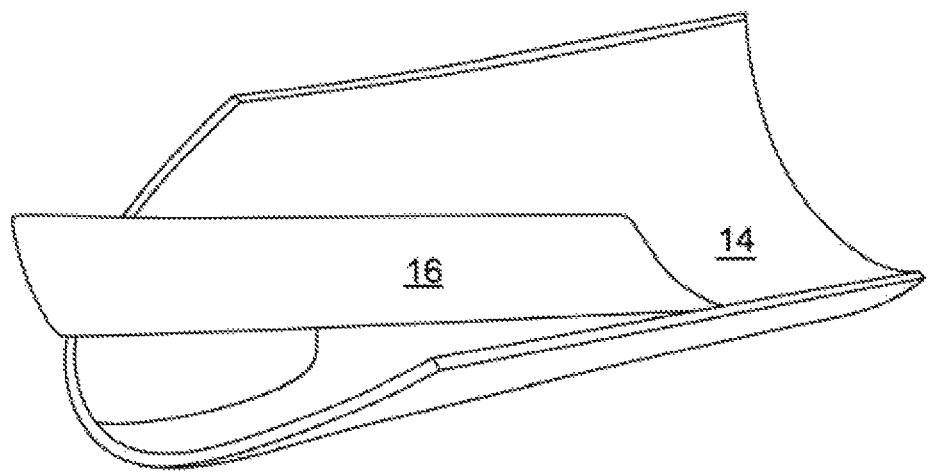
FIG. 9 is a top perspective of the slide plate and ramp of the device shown in FIGS. 2-4.
Figure 10:
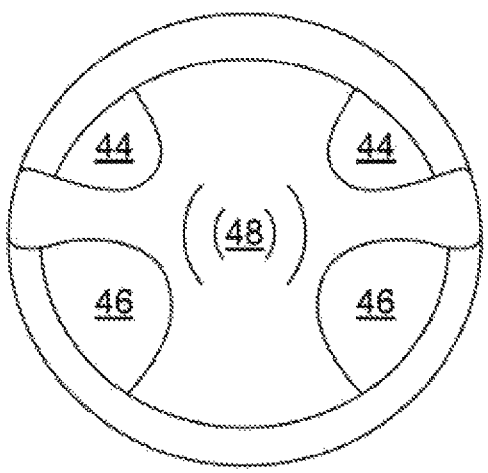
FIG. 10 is a rear view of an egg separation assembly of the device shown in FIGS. 2-4.

The breaker bar 36 may be movably mounted to the arms 34a and 34b to facilitate adjustment of the breaker bar 36. In one example, the breaker bar 36 is coupled to an actuator 40 (FIG. 11), such as a protruding knob or the like, which allows a use to rotate the breaker bar 36 as needed. The breaker bar 36 has at least two functional edges. As shown, however, the breaker bar has three preferable three functional edges. In the illustrated embodiment, the breaker bar 36 has a cross-sectional shape that approximates an equilateral triangle. Other cross-sectional shapes may be employed so long as the breaker bar has two or more functional edges. In this regard, each functional edge is manufactured to a have different degree of sharpness, as best shown in FIGS. 5A-5C. For example, the breaker bar 36 shown in FIGS. 5A-5C has three edges: a first edge A, which may be blunt; a second edge B, which may have a medium sharpness; and a third edge C that is sharper than the rest. The different functional edges are configured to facilitate cracking different egg shells because different eggs have different shell hardness. For example, store bought eggs have soft shells and would use a blunt edge. Farm-fresh eggs or brown eggs have very hard shells due to a higher content of calcium these chickens have more exposure to sunlight and thus vitamin D, and hence may require a more sharp edge. Accordingly, the breaker bar is movable, or rotatable, to orient one of the edges into a predetermined orientation.

In use, it is beneficial that a user approach the breaker bar 36 in a desired direction to create a specified angle with respect the desired functional edge of the breaker bar 36. Thus, the user can use the actuator 40 to orient the edge toward the approaching egg. In the illustrated embodiment, user can select the appropriate edge by rotation of breaker bar 36 via the actuator 40. In this example, the actuator 40 is a knob that protrudes from one of the arms. However, other mechanisms to change the position of the breaker bar 36 may be used. After the contents of the egg are spilled onto the open section 49 of chute 12, the yolk and white slide down the chute 12 by gravity feed alone.

The device 2 also includes a movable egg-shell catcher 28. The movable egg-shell catcher 28 is rotatably coupled the enclosed section 50 of the chute 12 at pivot point 27. The pivot point 27 may be defined by any coupling mechanism that allows the moveable egg-shell catcher to rotate or pivot with respect to point 27. The slide pin 19 can be used by the use to help position the moveable egg-shell catcher 28 in the correct position. In use, if the rear half of the egg shell should also fall from the hands of the user onto the chute it will be caught by a movable egg-shell catcher 28 that leaves enough bottom clearance to let the egg contents proceed beneath it along the chute.

Figure 4:
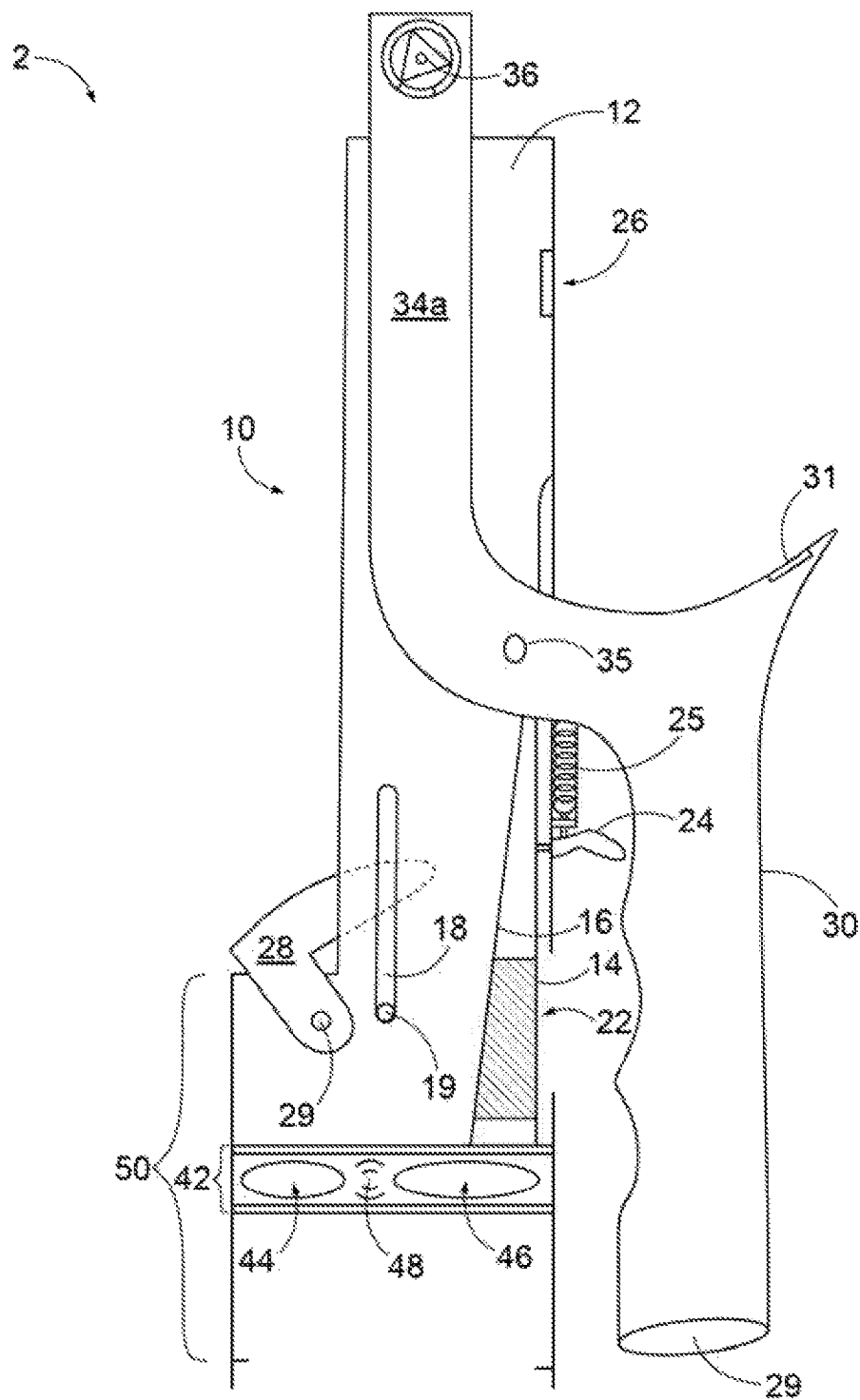
FIG. 4 is a side view of the same device as in FIGS. 2-3 illustrated in a folded configuration for storage.

FIGS. 3 and 4 illustrate how the device 2 can transition between a folded configuration for storage (FIG. 4) and an active configuration (FIG. 3) for use. In the folded configuration, the device 2 has a footprint of about 3.5 inches by 3.5 inches. However, the footprint in the folded configuration may be more than 3.5 inches by 3.5 inches. In certain embodiments, the base 30 includes a magnet 29 that may be used to secure the device 2 to a metal stovetop or carried in a holster. The magnet 29 may be a like neodymium magnet.

Figure 11:
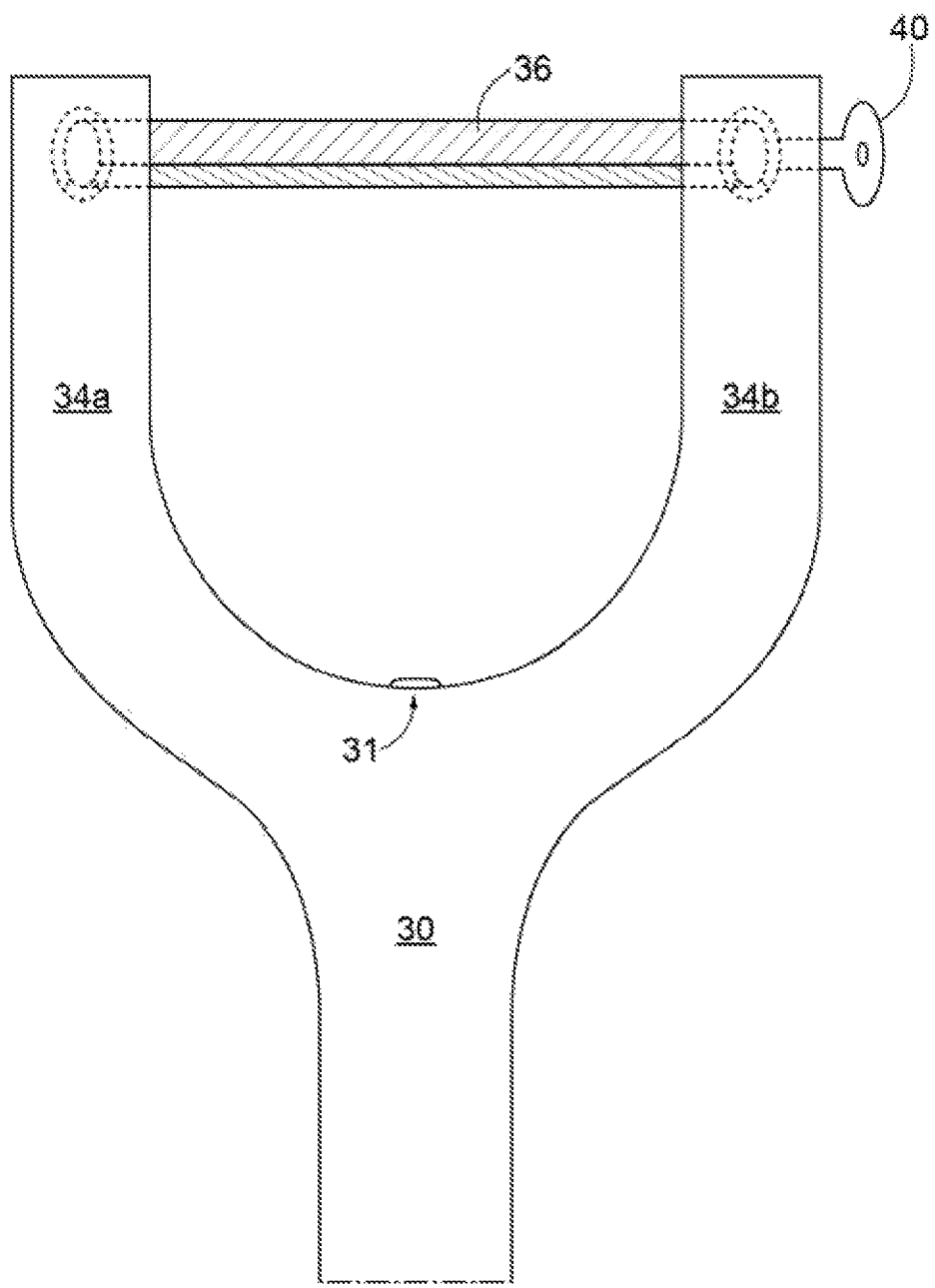
FIG. 11 shows illustrates a base of the device according to another embodiment of the present disclosure.

FIGS. 5A-5C illustrate an embodiment of a breaker bar 36 used on the device 2. As shown, the breaker bar 36 includes an apex 38a and a rearward surface 39a that extends from the apex 38a in a direction generally toward the rear or back of the device. The apex 38a of each edge of the breaker bar 36 is directed slightly forward toward the front the device. However, the apex 38a lies on a plane that intersects a vertical plane at a specific angle. The specified angle may range from 0 degrees to 90 degrees. However, the angle may vary forward toward the front or rearward toward the back of the device, depending on the orientation of the breaker bar 36 following rotation via the actuator 40 (FIG. 11). For example, the angle may range from 0 degrees to +45 degrees forward or 0 to −45 degrees rearward relative to vertical plane. In a preferred example, the angle is between 10 and 20 degrees. In such an example, the angle is between +5 to +20 degrees forward of the vertical plane or −5 to −20 degrees rearward of the vertical plane. The rearward surface 39a of the breaker bar 36 guides the broken egg toward the chute 12. More specifically, the rearward surface 39a of the breaker bar 36 is angled to provide a platform onto which the yolk and albumen will land and gently diverts them down and back to the chute 12. However, to correctly break an egg shell one-handed, the direction of force should be directly down onto the breaker bar 36. Once the shell is cracked a sharp pull backwards is performed leaving the forward half of the shell behind allowing the back part of the egg to release the contents of the egg yolk and albumen together to fall upon rearward surface 39a of the breaker bar 36 before landing on the chute 12.

FIGS. 3 and 6-10 illustrates aspect of the device 2 which facilitates separation of the yolk from the egg white using ramp 16. As shown in the Figures, the device 2 includes a ramp 16 disposed on the chute 12 (FIG. 3) and gradually extends upward relative to the surface of the chute 12 itself. In addition, the ramp 16 has a width that is narrower than the width of the chute 12 so that a gap is formed between the sides of the ramp and the wall of the chute 12. In use, as perhaps best shown in FIG. 3, as the fluid contents of the egg are fed downward along the chute 12, the ramp 16 gradually elevates the yolk above the egg white and the egg white slides over the sides of the ramp, effectively separating the egg white from the yolk without breaking the yolk.

As shown in FIGS. 2 and 4, the device 2 may include a trigger mechanism 24 to selectively open and close a release hole 22. Sometimes the release hole 22 is referred to as a trap door 22. The trigger mechanism 24 can permit a user to perform all the functions with one hand, including the release of the egg yolk after separation is performed. The trigger mechanism 24 includes a spring 25 is coupled the trap door 22. The trigger 24 can be pulled, which, in turn, causes the trap door 22 to open. Release of the trigger 24 allows the trap door to snap closed. In one example, the trigger 24 may be coupled to a slide plate 14. The slide plate 14 includes tabs 19 that extend into a ride along a guide track 17 formed in the chute. The slide plate 14 thus slides along the guide track 19 when moved. The slide plate 14 covers a release hole (not numbered) defined in the chute 12. The release hole is positioned rearward of the egg separation assembly. The slide plate 14 may be retracted by actuation of the trigger 24, which may release the yolk through the release hole. Furthermore, the retraction of the slide plate 14 may cause the ramp 16 to elevate above the chute 12. This in turn ejects the separated yolk down through trap door 22 after the egg white has filtered through as will be described further below.

Turning to FIGS. 6-10, an egg separation assembly 42 removably attached to the enclosed section 50 of the chute 12. The egg separation assembly 42 may include an outer body and an inner curved panel that defines a concave center 48 and at least two vents. In one example, the egg separation assembly has at least two separate pairs of vents 44, 46. The two separate pairs of vents may be referred to as first pair of vents 44 and a second pair of vents 46. The concave center 48 is configured to seat the egg yolk when it reaches the end of the ramp 16. The yolk may be retained within the concave center 48. The first and second pairs of vents 44, 46 are designed to separate the yolk from the albumen without allowing the yolk to slip through should yolk fall from the ramp 16. As illustrated, the first pair of vents 44 may be smaller than the second pair of vents 46. For instance, the first pair vents 44 are sized for smaller eggs. Conversely, the second pair of vents 46 are sized for larger eggs, e.g. jumbo eggs. The egg separation assembly, though coupled to the chute 12, is rotatable relative to the chute 12 so that a user can direct which particular vents (smaller vs. larger vents) are positioned in the lower position. In this manner, the appropriate pair of vents 44, 46 can be rotated to the lower position to accommodate different egg types. More viscous egg whites command larger vents. It should be appreciated that egg white viscosity depends on the type of egg as well, e.g. store bought vs. farm fresh. Furthermore, the age of egg affects viscosity; fresher eggs can have more a more viscous albumen compare with an older or less fresh egg. Thus, the egg separation assembly creates added flexibility to separate a wide variety of egg types. Even so, the user could still hold the device vertically 90 degrees or even shake the device to separate very tenacious albumen.

Referring back to FIGS. 2-3, the device 2 may include a removable nozzle 52. The removable nozzle 52 may be used to slow exit of the egg or egg white from the device 2. This functionality may be important if the user plans to cook more than one egg. The nozzle will allow the use to better direct where you want the egg to end up in the pan. The nozzle 52 can also include a removable cap to close off the end of the nozzle. The cap allows the use to transport the device to another location, for example, such as to a camp fire if you are out camping, etc.

Referring now to FIGS. 2, 3 and 11, another embodiment of the device is illustrated with one or more attachment devices to secure the chute assembly 10 in place. More specifically, the support base 30 may include an attachment device 31 positioned on support base 30 inside between the arms 34a, 34b. The attachment device 31 may be magnet, tab, projection, or another feature. The chute assembly 10 may include another attachment device 26 configured to attach to the attachment device 31 on the support base 30. The attachment devices 26 and 31 may be opposing magnets, mechanical couplers, or any other mechanism that will removably couple the chute assembly 10 to the support base 30. For instance, in one example, opposing magnets or metal inserts may be spaced radially along the open section 49 of chute 12 to releasably attach the chute assembly 10 to support base 30. This way, the device 2 may be securely seated and fixed in the proper position for usage with the nozzle 52 directed into a pot or pan.

The base, chute and arms may be formed from any polymeric material. In one example, the base, chute and arms may be formed from polyvinyl chloride (PVC). However, any suitable thermoplastic or thermoset polymer or copolymer may be used.

It should now be apparent that a feature of the above-described device helps the user to break and open a single egg. It can then separate an egg yolk from its egg white while keeping it intact. The entire operation can reasonably be completed with one hand, in seconds, with no mess or fuss.

Embodiments of the present disclosure include a device for breaking and optionally separating the egg yolk from the egg white. An aspect of the device is to provide an egg breaking and separating device as described above that operates with minimal effort but has reliable and consistent operation. Another aspect of the present disclosure is a device that gently extricates the yolk from the albumen and isolates the yolk while the albumin is drained. In this regard, the yolk is ejected into a receptacle via gravity. In yet another aspect of the present disclosure, the device may be used in either a consumer and or commercial setting, for example to process a large number of eggs in a reasonable short period of time.

FIGS. 12-24 illustrate another embodiment of a device 100 for breaking and optionally separating the egg yolk from the egg white. Referring to FIGS. 12-15, the device 100 is shown that includes a support base 110, a chute 130 coupled to the support base 110, a nozzle 150 coupled to the chute 130, and a breaker 170 positioned to span across the chute 130. The device 100 is configured to allow a user to hold the device in his or her hand and break an egg on the breaker 170. The breaker 170 is therefore configured to crack a shell of the egg so that its contents fall onto the chute 130 below. The egg contents then flow toward the nozzle 150, which includes an aperture 152 that is configured to permit the egg-white to exit the nozzle 150 while retaining the yolk within the nozzle 150. An optional egg-shell catcher 190 is coupled to the chute 130 near the nozzle 150. The egg-shell catcher 190 includes a lower wall 191 that is positioned to catch cracked egg shells as they slide along the chute 130, as further discussed below.

Figure 12:
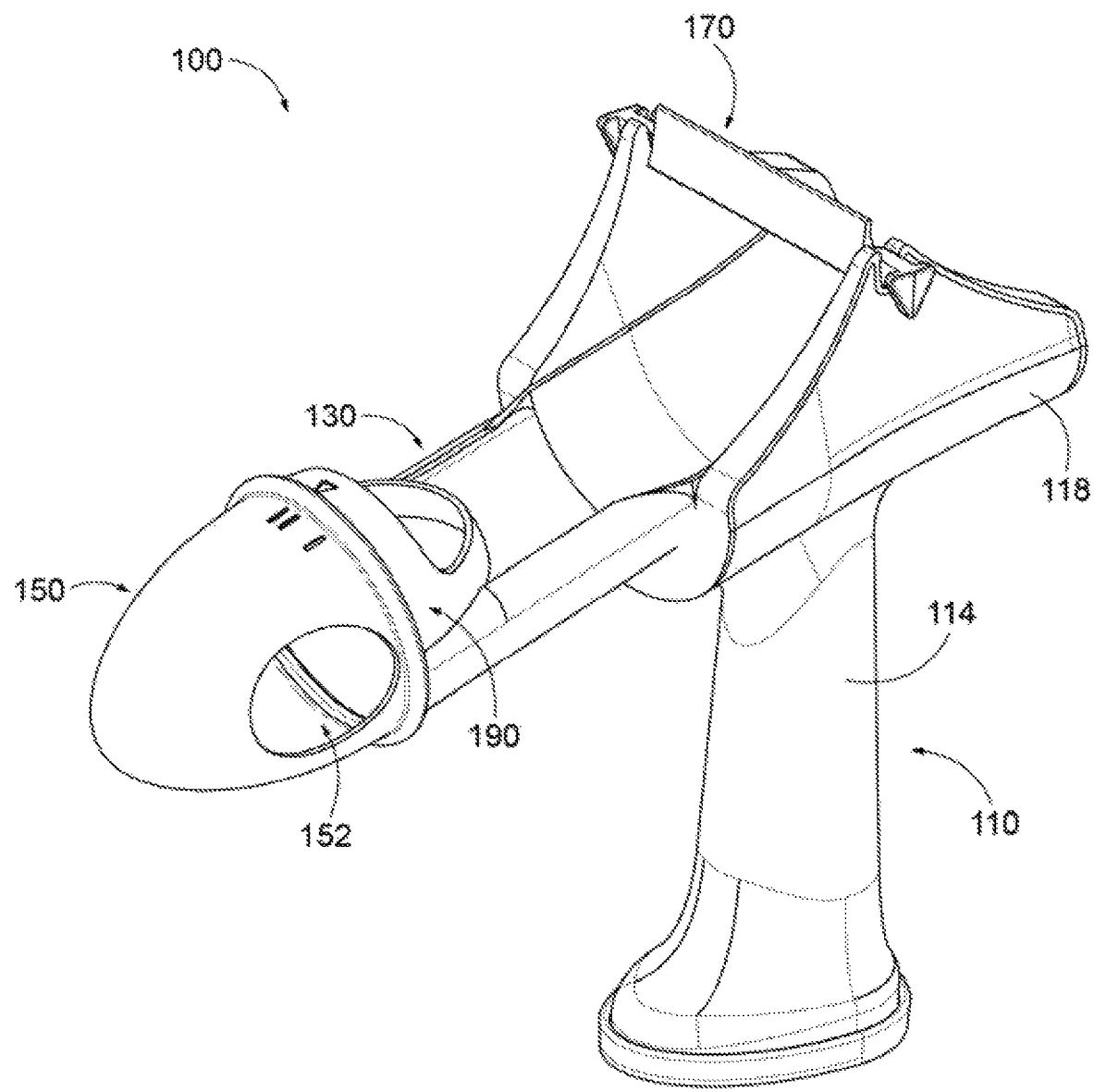
FIG. 12 is a perspective view of a device according to yet another embodiment of the present disclosure.
Figure 13:
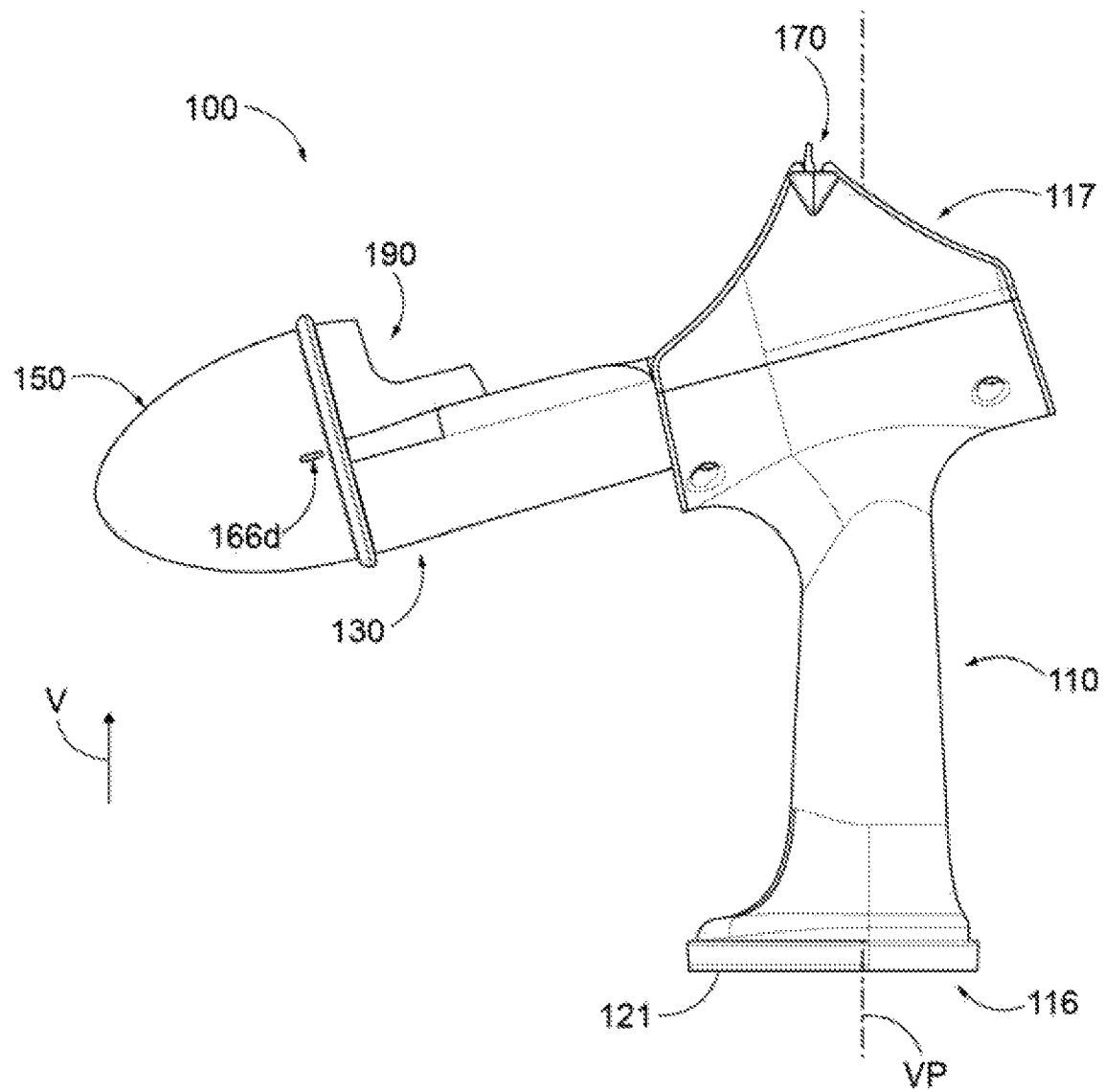
FIG. 13 is a side plan view of the device shown in FIG. 12.
Figure 14:
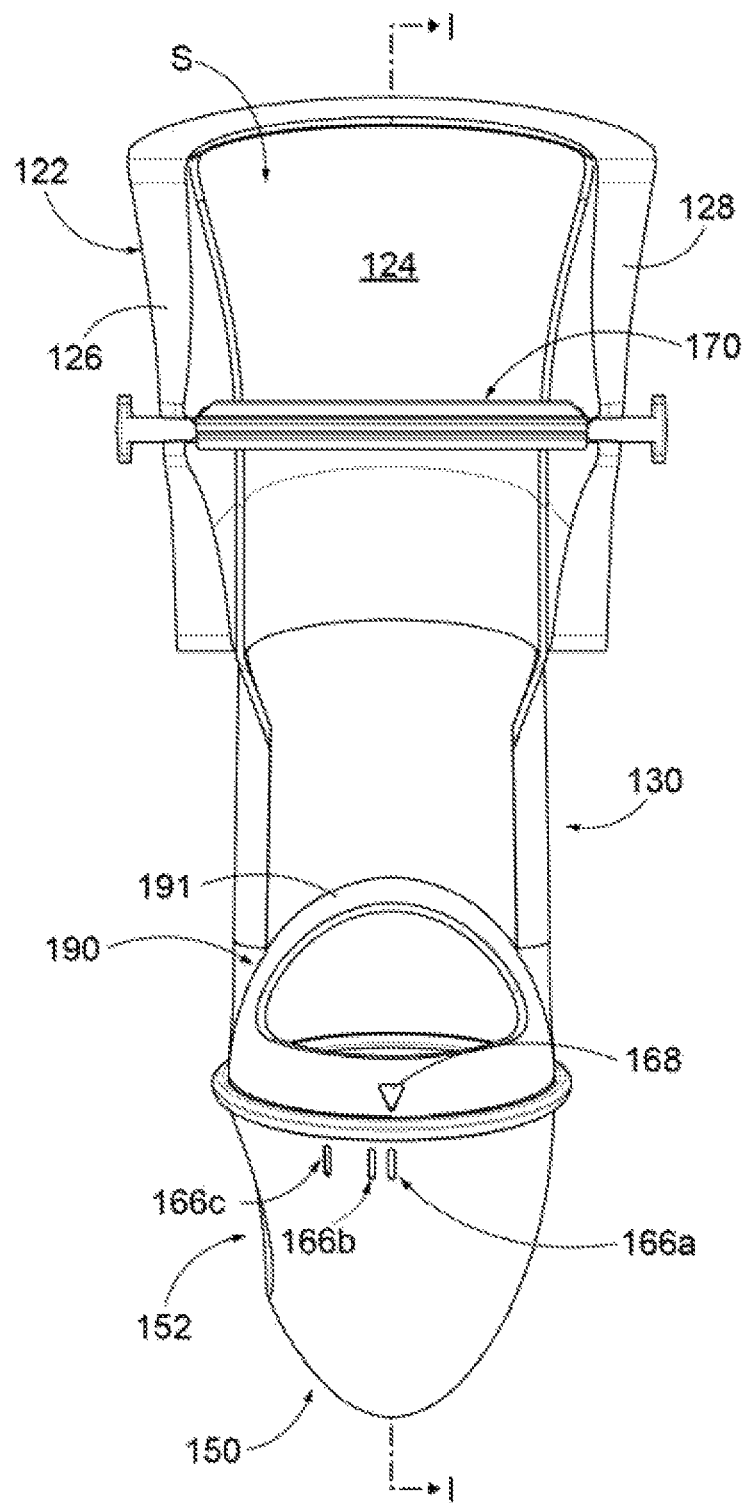
FIG. 14 is a top view of the device shown in FIG. 12.

Referring to FIGS. 12-15, the support base 110 has a handle 114 and a support member 118. The handle 114 is configured to ergonomically fit within the hand of a user. The support base 110 further includes a bottom 116 and a top 117 opposite the bottom 116 along a vertical direction V (FIG. 13). The support base 110 therefore extends vertically along a vertical plane VP when the device rests on a horizontal surface (not shown or numbered). The support base 110 may include a metallic rod 119 located inside handle and positioned proximate the bottom.

Referring to FIGS. 16 and 25A-25D, the device 100 may include magnet holder 220. The magnet holder 220 is removably coupled to the handle 114 such the holder 220 can be removed from the handle as needed. The magnet holder 220 includes a housing assembly 222 having a bottom plate 223, a top plate 226, an outer wall 227 that extends around a perimeter of the holder 100, and a magnet 228 positioned between the bottom plate 223 and the top plate 226. The magnet 228 may be similar to the magnet described above. For example, the magnet 228 may be a neodymium magnet. The outer wall 227 and top plate 226 define an internal cavity 225. The holder further includes an anti-skid layer 224 disposed on the bottom plate 223. The handle 114 is configured to be press fit into the holder in the outer wall 227 and cavity 225. The metallic rod 119 is magnetically coupled to the holder 100 via the magnet 228. The anti-skid 224 allows the device, or holder, to stay in place on the working surface. The handle 114 can be grasped positioned in the holder while the magnet couples the handle 114 to the holder 220.

Referring still to FIGS. 12-15, the support member 118 may be a cradle 122 configured to support the chute 130 and breaker 170. The cradle 122 includes a lower cradle wall 124, a first cradle wall 126, and a second cradle wall 128 opposite the first cradle wall 126. The first cradle wall 126 and the second cradle wall 128 extend upward relative to the lower cradle wall 124 to define a space S. The breaker 170 is positioned on the first cradle wall 126 and the second cradle wall 128 so that the breaker 170 spans across the chute 130. The first cradle wall 126 and the second cradle wall 128 defines notches 129a and 129b, respectively, which are sized to receive the breaker. The first cradle wall 126 and the second cradle wall 128 also define a pair of projections 129c and 129d that extend into the respective notches 129a and 129b, respectively. The pair of projections 129c and 129d removably couple the breaker to the cradle 122. While a notch and projection configuration is illustrated, the breaker may be movably or removably attached to the support base 110 by any particular mechanism. For example, the cradle may be configured to receive and permit a breaker to be adjusted while coupled to the cradle. In such an example, the breaker can be adjusted or rotated to position the breaker for the appropriate use and/or type of egg that is being cracked.

Referring now to FIGS. 15-18, the chute 130 is configured to receive the contents of the broken egg and guide them toward the nozzle 150. As illustrated, the chute 130 may be coupled to the support member 118. The chute 130 has a front end 132, a rear end 134 opposite the front end 132 along a central axis CA. The chute 130 includes a chute wall 136 that curves partially around the central axis CA. The chute 130 is partially open. As shown, the chute wall 136 terminates on either side of the central axis CA to create an open top section for the chute. The chute 130 may also include a first side rail 138 that extends inboard from the chute wall 136 and a second side rail 140 opposite the first side rail 138. The second side rail 140 also extends inboard from the chute wall 136 toward the first side rail 138. The first side rail 138 and the second side rail 140 are configured to guide cracked shells toward the egg-catcher 190 so that shells do not travel into the nozzle 150. In addition, the first side rail 138 and the second side rail 140 are configured to catch any residual parts of the egg such as the egg white or egg yolk when the device 100 is tilted to the right or to the left in order to release the egg yolk or the whole egg thru the aperture into a receptacle such that the countertop or stove top is not dirtied.

Continuing with FIGS. 15-18, the chute 130 may be angled with respect to the vertical plane VP of the device 100. More specifically, the chute 130 is angled with respect to the support base 110 so that central axis CA of the chute intersects and is angularly offset with respect to the vertical plane VP. The central axis CA may itself lie on a chute plane CP that defines an angle θ with respect to the vertical plane VP. The angle θ may be less than about 90 degrees. In one example, the angle θ may range between about 45 degrees and 90 degrees. In the illustrated embodiment, the chute slopes downwardly with respect to the breaker 170 when the device is resting on a horizontal surface. In alternative embodiments, however, the chute may be sloped or otherwise angled with respect to the support base 110.

Continuing with FIGS. 15-18, the chute 130 may be removably coupled to the support base 118. Located at the bottom of the chute wall 136 may be first coupling member 142 that is configured to couple to a second coupling member 144 disposed along the cradle 122. In this manner, the first and second coupling member are configured to removably couple the chute 130 to cradle 122. Thus, the chute 130 can be removed from the support base 110 for a more compact storage configuration. In one illustrated embodiment, the first coupling member 142 may be a projecting tab and the second coupling member 144 may be a recess and ridge to receive the projecting tab. However, in alternative embodiments, the first coupling member 142 and the second coupling member 144 may be any mechanical couplers or devices that can couple to each other. In still other embodiments, the chute may be monolithic with the otherwise attached to the cradle 122.

Figure 15:
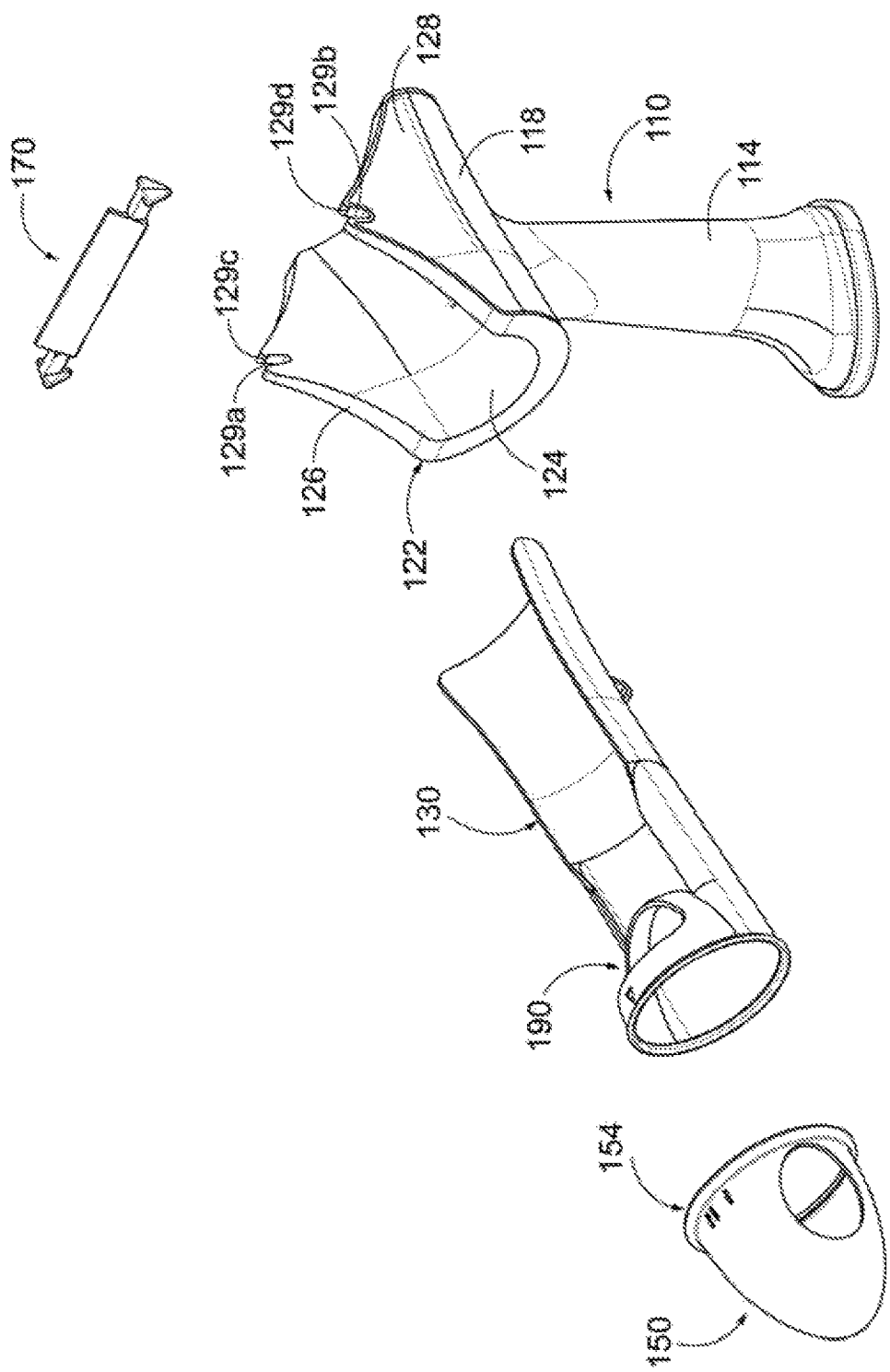
FIG. 15 is a top perspective exploded view of the device shown in FIG. 12.
Figure 16:
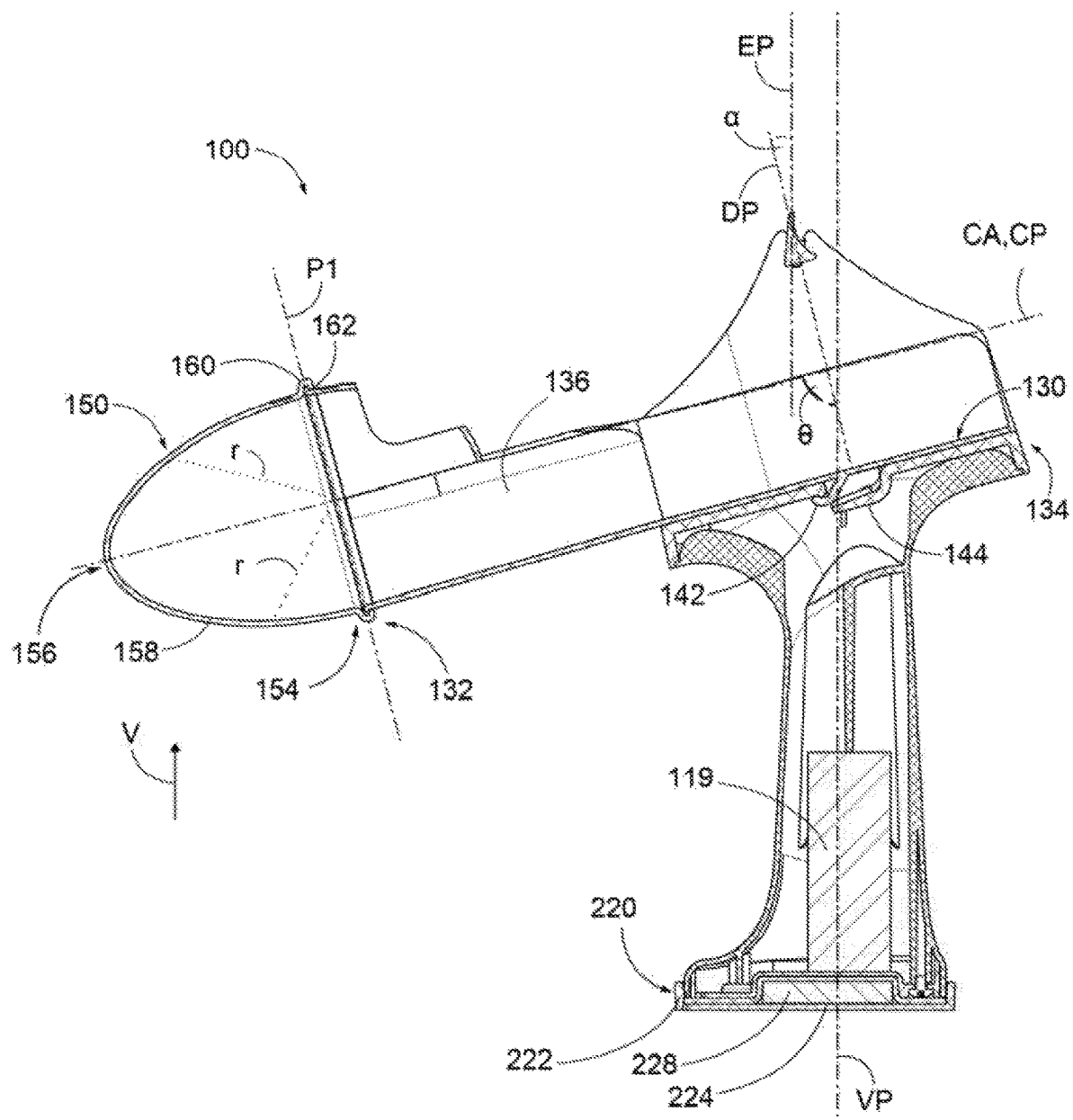
FIG. 16 is a cross-sectional view of the device taken along lines I-I in FIG. 14.
Figure 17:
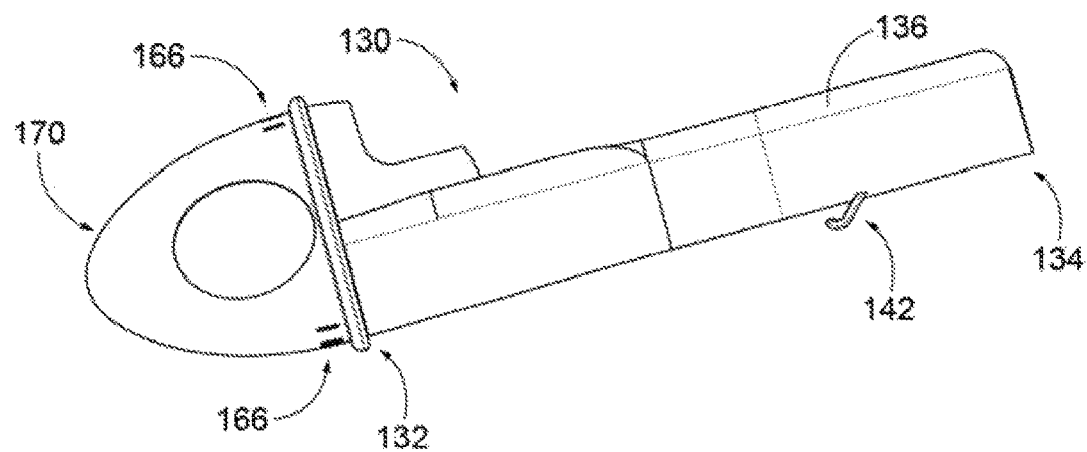
FIG. 17 is a side view of a chute of the device shown in FIGS. 12-16.
Figure 18:
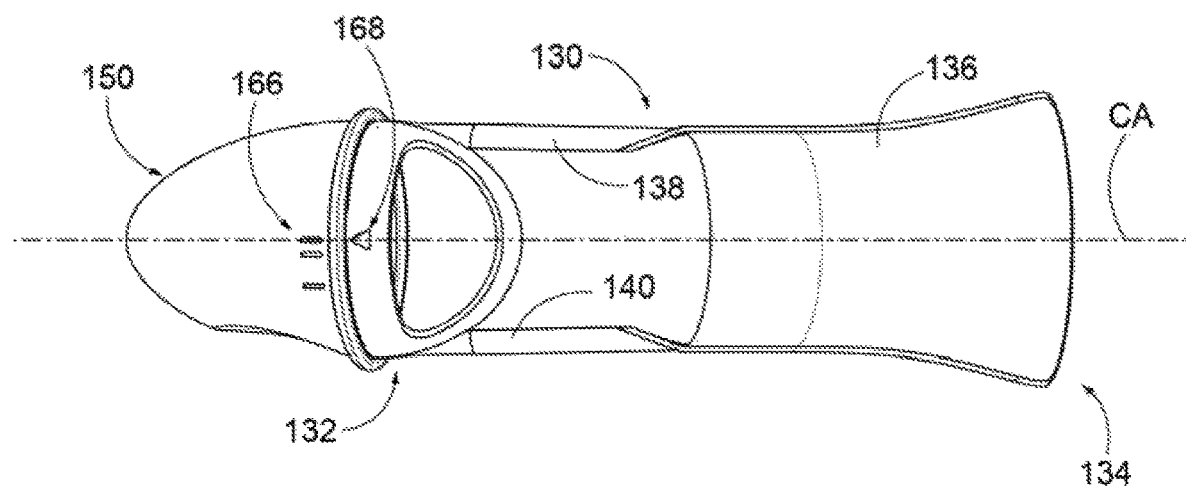
FIG. 18 is a top view of the chute shown in FIG. 17.
Figure 19:
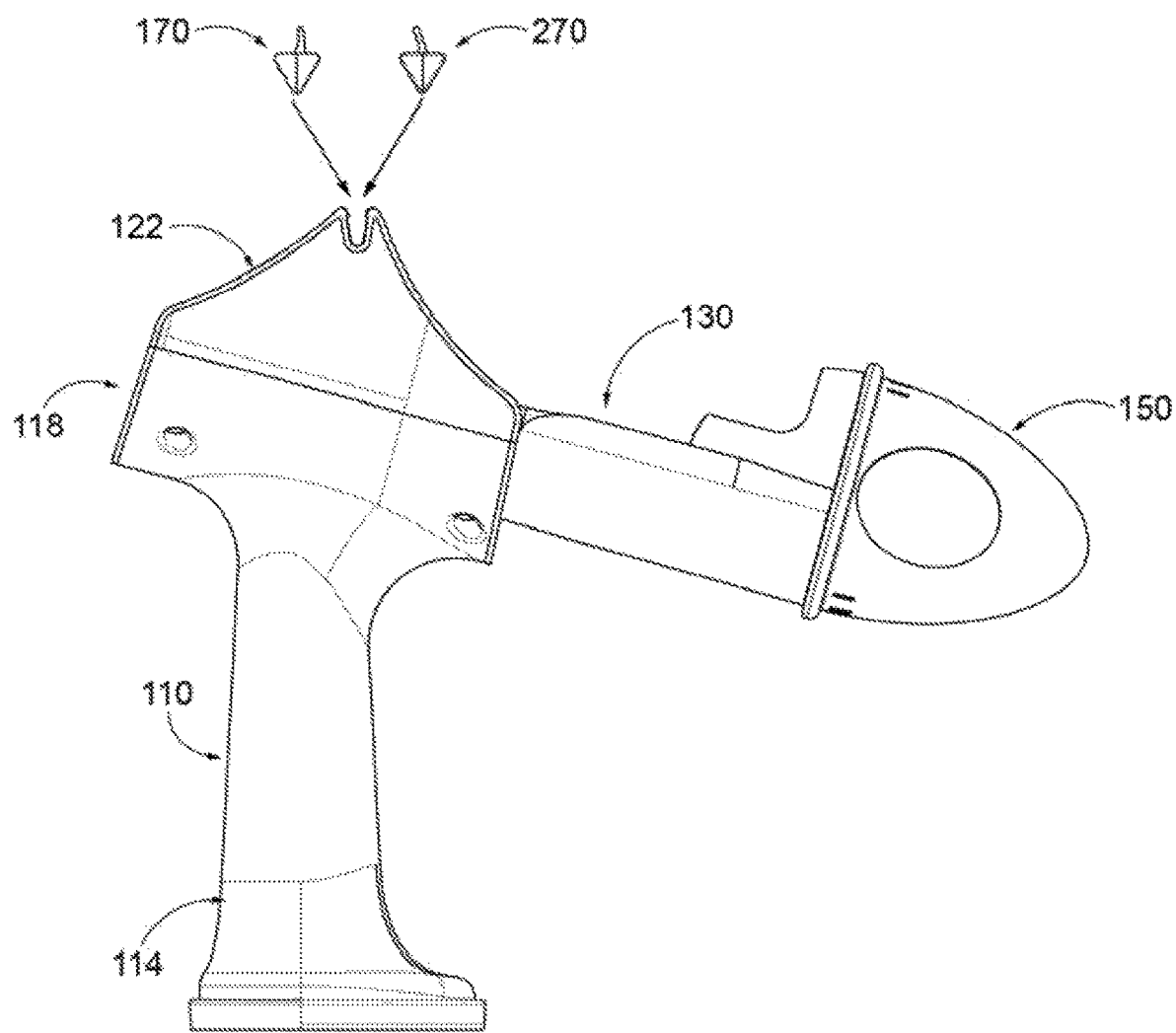
FIG. 19 is a side plan view of the device shown in FIG. 12, illustrating the inter-changeability of a breaker.

Referring to FIGS. 15 and 16, the nozzle 150 is configured to both receive the contents of the egg and permit the egg-white to exit the device 100. The nozzle 150 is coupled to the front end 132 of the chute 130. The nozzle 150 a nozzle base 154, a closed terminal end 156 opposite the nozzle base 154, and a curved outer wall 158 that extends forward relative to the nozzle base 154 along the central axis CA to define the closed terminal end 156. The curved outer wall 158 defines an aperture 152 that is disposed rearward of the closed terminal end 156. The aperture 152 is sized to permit an egg white, an egg yolk, or both, to pass therethrough. The closed terminal end 156 is spaced from the nozzle base 154 along the central axis CA.

Referring to FIG. 16, as illustrated, the nozzle is sized and shape to facilitate receiving the egg contents and allowing the white to separate from the yolk. The curved outer wall 158 is curved around the central axis CA and also curves along the central axis CA. In this regard, the nozzle has an internal surface (not numbered) with a double curvature. In particular, the nozzle base 154 is coupled to the chute 130 at a plane P1 that is perpendicular to the central axis CA. The curved outer wall defines a radius of curvature r with respect to a point that lies on the plane P1 and the central axis CA. As shown, the radius of curvature r varies along the curved outer wall 158. This curvature facilitates receiving the contents of the egg and permitting the egg-white to exit through the aperture 152.

Figure 24:
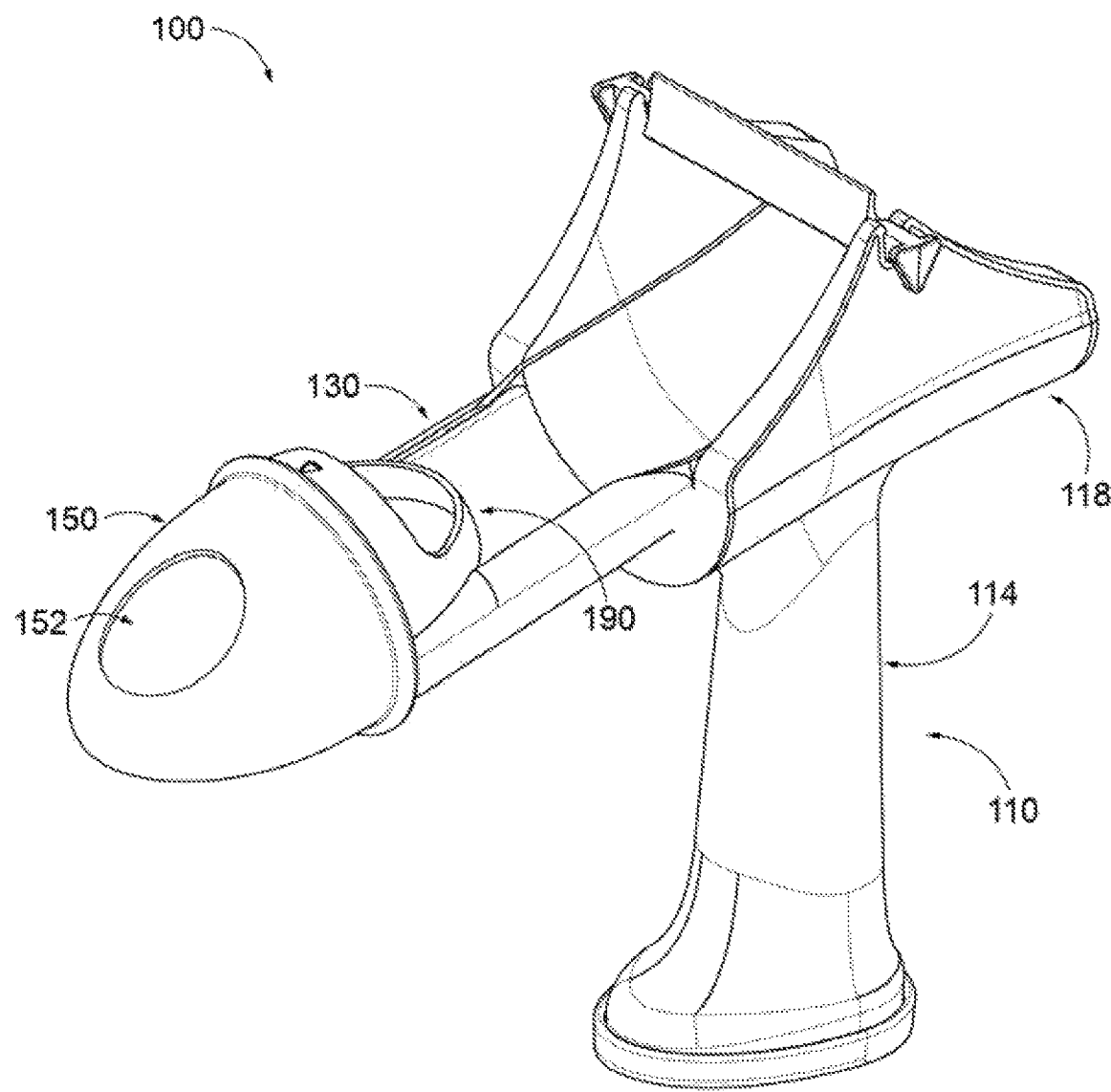
FIG. 24 illustrate the device with its nozzle rotated to a different position than that shown in FIG. 12.
Figure 25:
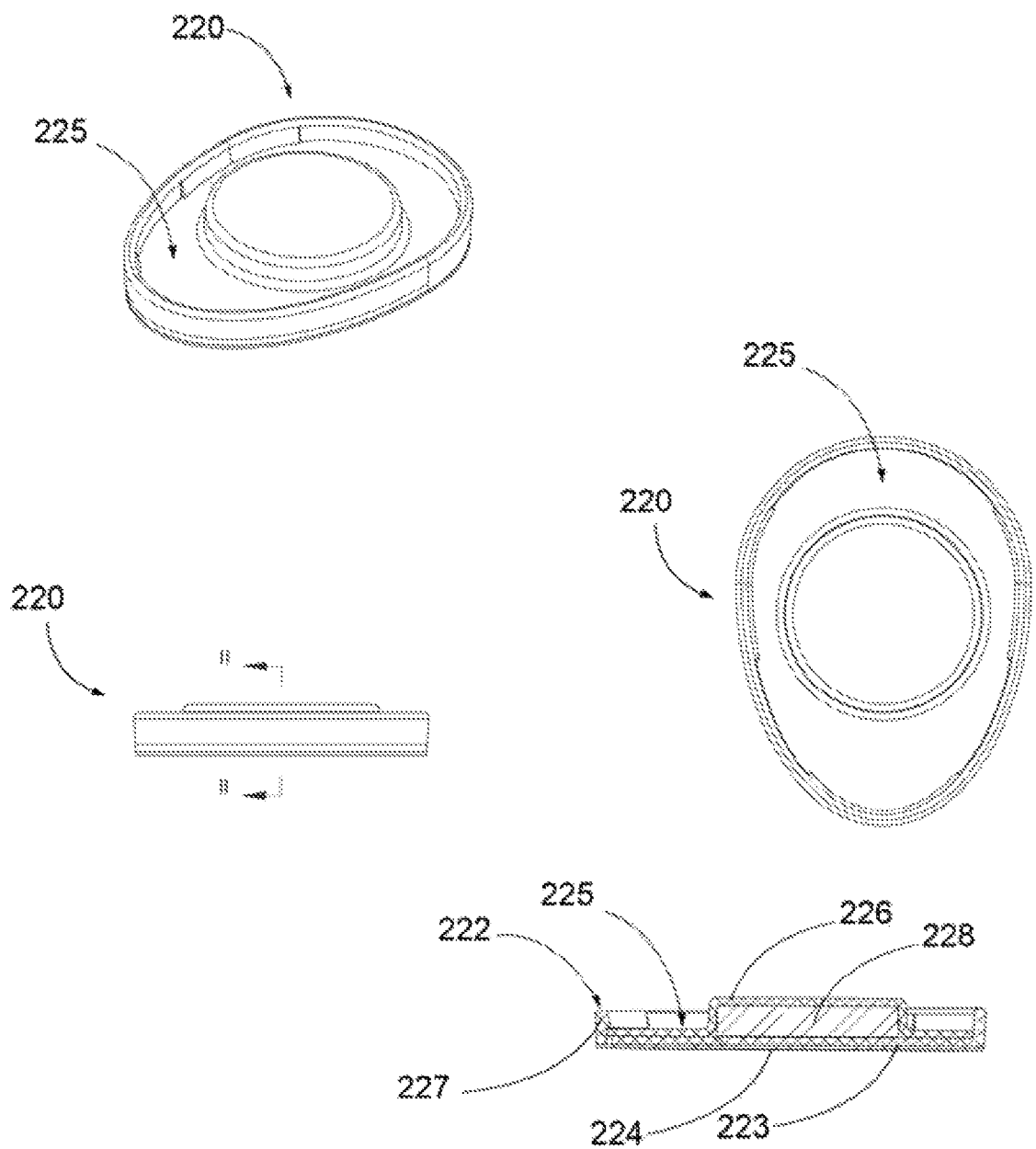
FIGS. 25A, 25B, and 25C is a perspective view, top view and a side view, respectively, of a component of the device according to an embodiment of the present disclosure.
FIG. 25D is a cross-section of the component shown in FIG. 25C taken along line 11-11.

As shown in FIGS. 12-17, the nozzle base 154 is configured to be movably and/or removably coupled to the chute 130. As illustrated, the nozzle base 154 defines a circular perimeter that extends around the central axis CA. The perimeter of the base 154 generally confirms the perimeter of the front end 132 of the chute 130 and the forward end of the egg-catcher 190. As illustrated best in FIG. 16, the nozzle 150 has a first connector 160 and the front end 132 of the chute 130 has a second connector 162 configured to mate with the first connector 160. In one example, the first connector 160 is a recess that extends around the inner perimeter of the base 154. The second connector 162 is a ridge sized to fit into the recess to couple the nozzle 150 to the chute 130 and egg-catcher 190. It should be appreciated that nozzle 150 can have a ridge or the chute and egg-catcher can have a recess sized to receive the ridge. The first connector 160 and the second connector 162 are also configured to permit the nozzle 150 to move relative to the chute 130. This permits the position of the aperture 152 relative to the chute 130 to be adjusted as needed. As such, the nozzle 150 is rotatable relative to the chute 130 so as to transition from a first position, as shown in FIG. 12, where the aperture 152 permits an egg white of the egg to pass therethrough while the nozzle can retain the egg yolk, and a second position, as shown in FIG. 24, that is different from the first position.

As shown in FIGS. 14, 15, 17, and 18, the nozzle 150 may also include one or more marks 166a-166d to help align the nozzle 150 and aperture 152 in the desired position. The marks 166 by recesses, projections, tabs, or may be otherwise printed on or applied to the nozzle. The egg-catcher 190 and chute 130 may have similar marks 168 to facilitate alignment of the nozzle and chute with respect to each other. As illustrated, the nozzle is movable to different position based on the desired use. In the illustrated embodiment, the nozzle could have four positions although it could have more than four or less than four. A first position of the nozzle is when marking 166a is aligned with marking 168. In the first position, the aperture permits a large egg white to pass through the aperture of the nozzle. The second position of the nozzle is when the marking 166b is aligned with marking 168. In the second position, the aperture is positioned to facilitate separating the egg-white from the yolk of a jumbo-sized egg. The third position of the nozzle is when the marking 166c is aligned with the marking 168 so that the aperture is positioned to prevent the egg contents from exiting the nozzle, such as when a user wants to transport an egg in the device from one location to another without spilling it. The fourth position is when marking 166d is aligned with marking 168 such that the aperture is positioned to face downwardly when the device is resting on a horizontal surface. When the nozzle is in the third position, the contents of the egg will exit the nozzle when the chute is turned up to 90 degrees clockwise or counterclockwise.

The nozzle 150 may be formed from a polymeric material or a metallic material. In one example the nozzle 150 is formed from silicone. The chute 130, however, may be polymeric, metallic, or comprise of a paper laminate with a smooth surface. The support base 110 may be polymeric material, or a metallic material. In one example, the chute 130 and support base 110 are injection molded parts. However, any suitable materials and manufacturing methods may be used to form the nozzle, chute, and support base.

Referring now to FIGS. 12-15, the device 100 includes a breaker 170 configured to crack and egg. The breaker 170 is positioned on the support member 118 to span across the central axis CA of the chute 130. Furthermore, the breaker 170 may positioned generally rearward of the nozzle 150 above the chute 130 (when the device is resting in a horizontal surface). In the illustrated embodiment, the device 100 may include a first breaker 170 and a second breaker 270 that are interchangeable with respect to each other. The first breaker 170 may be used in a certain circumstance and the second breaker may be used in another circumstance. Alternatively, a single breaker may be used to is adjustable to facilitate different use cases. Reference is now made to the first breaker 170.

Figure 20:
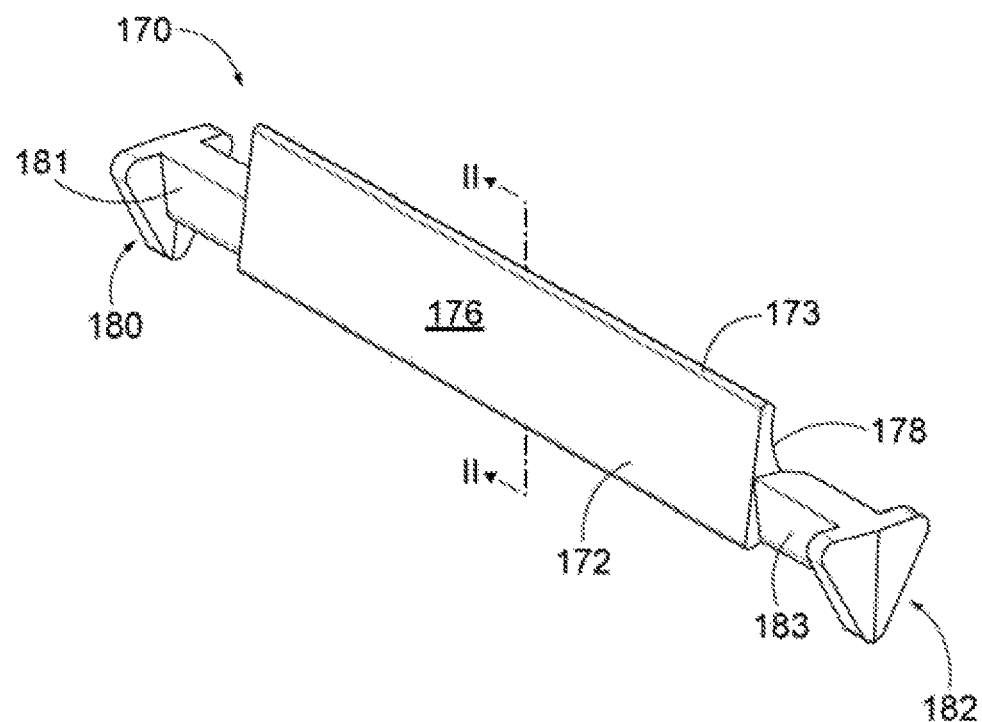
FIG. 20 is a perspective view of one example of the breaker shown in FIG. 19.

As shown in FIG. 20, the first breaker 170 includes a breaker body 172 having a breaker edge 173. The breaker body 172 includes a lower wall 174, a first side wall 176, and a second side wall 178. The first side wall 176 and the second side wall 178 each extend upwardly from the lower wall 174 and intersect to define the breaker edge 173. The breaker edge 173 may define a rounded edge. In one example, the edge may have a width between about 0.01 inches and 0.07 inches. The breaker edge 173 itself may comprise two surfaces that contact and intersect at an apex. At least one of the first side wall and the second side wall is curved with respect to the other wall, as needed. The breaker includes a first end 180 and a second end 182 opposite the first end 180. The first end 180 has a first engagement member 181 and the second end 182 has a second engagement member 183. The first engagement member 181 and the second engagement members 183 are configured to be removably coupled to the cradle 122 via engagement with the notches 129a and 129b and projections 129c and 129d of the cradle. In this manner, the breaker 170 is positioned on the first cradle wall 126 and the second cradle wall 128 so that the breaker 170 spans across the chute 130. The breaker 170 may be made from polymeric materials, as needed. Alternatively, the breaker may be made from metal.

Figure 21:
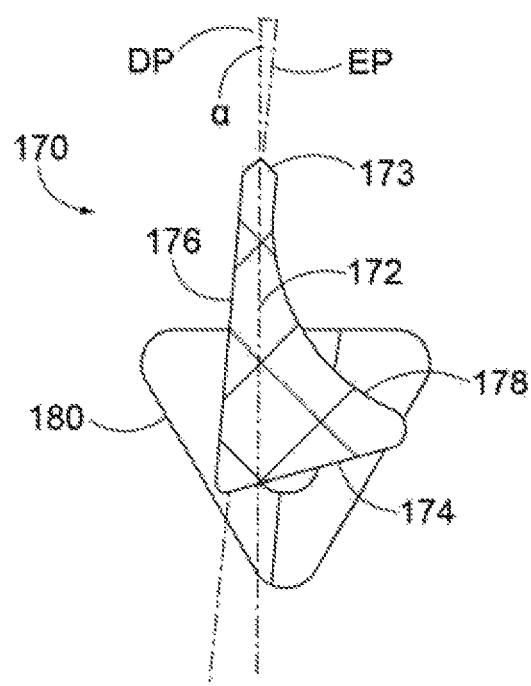
FIG. 21 is a cross-section view of the breaker take along line II-II in FIG. 20.

As best shown in FIGS. 20 and 21, the breaker edge 173 is aligned along an edge plane EP that is angled with respect to a plane DP that is perpendicular with respect to the chute wall at a line below the breaker 170. The edge EP and the plane DP define an angle α that is up to about 45 degrees. In example, the angle α is between 5 degrees and 30 degrees. In one example, the angle α is about 5 degrees for the breaker 170. As noted above, the breakers may be interchanged to define a new edge angle for a particular type of use. For instance, the second breaker 270 is substantially similar to the first breaker except that the angle of the breaker edge between two breakers 170 and 270 are different.

Figure 22:
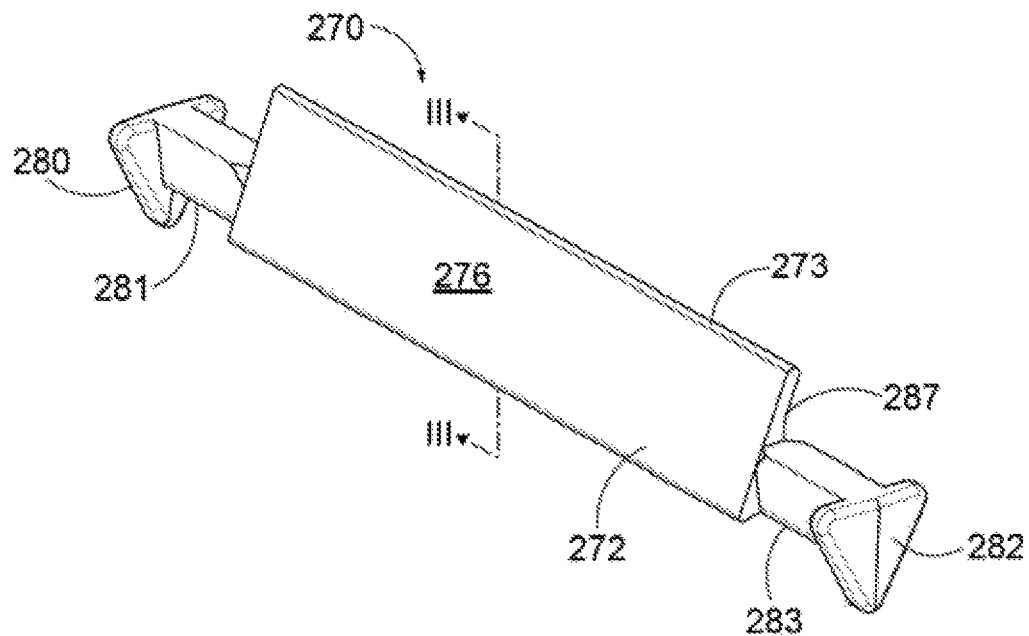
FIG. 22 is a perspective view of another example of the breaker shown in FIG. 19.
Figure 23:
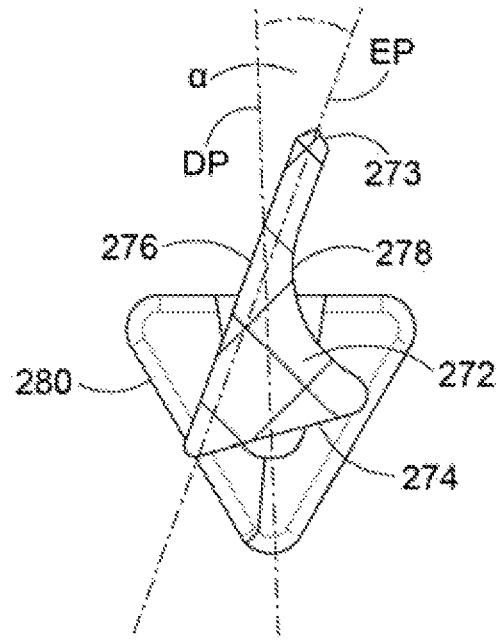
FIG. 23 is a cross-section view of the breaker take along line in FIG. 22.

As shown in FIGS. 22 and 23, second breaker 270 includes a breaker body 272 having with a breaker edge 273. The breaker body 272 includes a lower wall 274, a first side wall 276, and a second side wall 278. The first side wall 276 and the second side wall 278 each extend upwardly from the lower wall 274 and intersect to define the breaker edge 273. The breaker edge 273 itself may comprise two surfaces that contact and intersect at an apex (not numbered). At least one of the first side wall 276 and the second side wall 278 is curved with respect to the other wall, as needed. The breaker includes a first end 280 and a second end 282 opposite the first end 280. The first end 280 has a first engagement member 281 and the second end 282 has a second engagement member 183. The first engagement member 281 and the second engagement member 283 are configured to be removably coupled to the cradle 122 via engagement with the notches 129a and 129b and projections 129c and 129d of the cradle.

The foregoing among other objectives and other objects are accomplished with a device for breaking and opening an egg. The device generally comprises a support base attached to a separation chute. The support base supports a breaker upon which an individual can manually crack an egg. The chute below the breaker catches the egg and then passes it down the chute into the nozzle. As the egg travels down the chute either 1) the whole egg ore 2) yolk is maintained in the nozzle while the egg white exits the aperture.

Having now fully set forth the embodiments and certain modifications of the concept underlying the present invention, various other embodiments as well as certain variations and modifications of the embodiments herein shown and described will obviously occur to those skilled in the art upon becoming familiar with the underlying concept. It is to be understood, therefore, that the invention may be practiced otherwise than as specifically set forth in the appended claims.

What is claimed:

1. A device configured to break and open an egg, the device comprising:
a support base having a handle and a support member;
a chute coupled to the support member, the chute having a front end, a rear end opposite the front end along a central axis; and
a nozzle coupled to the front end of the chute, the nozzle having a nozzle base, a closed terminal end opposite the nozzle base, a curved outer wall that extends forward relative to the nozzle base along the central axis to define the closed terminal end, and an aperture in the curved outer wall disposed rearward of the closed terminal end, wherein the aperture is sized to permit an egg white, an egg yolk, or both, to pass therethrough, wherein the nozzle is rotatable relative to the chute so as to transition from a first position, where the aperture permits an egg white of the egg to pass therethrough while the nozzle retains the egg yolk, and a second position different from the first position.

2. The device of claim 1, wherein the closed terminal end is spaced from the nozzle base along the central axis, the nozzle base having a circular perimeter that extends around the central axis.

3. The device of claim 1, wherein the nozzle base is coupled to the chute at a plane that is perpendicular to the central axis, and the curved outer wall defines a radius of curvature with respect to a point that lies on the plane and the central axis, wherein the radius of curvature varies along the curved outer wall.

4. The device of claim 1, wherein the nozzle has a first connector and the front end of the chute has a second connector configured to mate with the first connector.

5. The device of claim 4, wherein one of the first connector or the second connector is recess and the other of the first connector or the second connector is a ridge sized to be press-fit into the recess.

6. The device of claim 1, wherein the nozzle is formed from a polymeric material or a metallic material.

7. The device of claim 1, wherein the nozzle is formed from silicone.

8. The device of claim 1, further comprising an egg-shell catcher coupled to the chute and the base of the nozzle, wherein the egg-shell catcher includes a lower wall extends rearward relative to the nozzle along the chute.

9. The device of claim 1, further comprising a breaker positioned on the support member to span across the central axis of the chute, wherein the breaker is configured to crack a shell of the egg.

10. A device configured to break and open an egg, the device comprising: a support base having a handle and a support member;

a chute coupled to the support member, the chute having a front end, a rear end opposite the front end along a central axis; and a cradle supporting the chute;

a nozzle coupled to the front end of the chute, the nozzle having an aperture that is sized to permit an egg white, an egg yolk, or both, to pass therethrough; and a breaker positioned on the support member to span across the central axis of the chute, breaker having breaker body having with a breaker edge aligned along an edge plane that is angled with respect to a vertical plane when the device is resting on a horizontal surface, wherein the breaker includes a first end and a second end opposite the first end, the first end having a first engagement member and the second end having a second engagement member, wherein the first and second engagement members are configured to be removably coupled to the cradle.

11. The device of claim 10, wherein the edge plane and the vertical plane define an angle that is up to about 45 degrees.

12. The device of claim 10, wherein the breaker body includes a lower wall, a first side wall, and a second side wall, the first side wall and the second side each extend upwardly from the lower wall and intersect to define the breaker edge.

13. The device of claim 12, wherein at least one of the first side wall and the second side wall is curved with respect to the vertical plane.

14. The device of claim 10, wherein the breaker is a first breaker and the device further comprises a second breaker positionable on the support member, wherein the first breaker and the second breaker are interchangeable.

15. The device of claim 10, wherein the support member is a cradle with a lower cradle wall, a first cradle wall, and a second cradle wall opposite the first cradle wall, and the first and second cradle walls extend upward relative to the lower cradle wall to define a space.

16. The device of claim 15, further comprising a breaker having breaker body having with a breaker edge aligned along an edge plane that is angled with respect to a vertical plane when the device is resting on a horizontal surface, wherein the first cradle wall and the second cradle wall each defines a notch sized to receive the breaker, and a pair of projections that extend into the notch to removably couple the breaker to the first cradle wall.

\* \* \* \* \*